United States Patent
Aritomi

(10) Patent No.: US 7,600,050 B2
(45) Date of Patent: Oct. 6, 2009

(54) INFORMATION PROCESSING APPARATUS, INFORMATION PROCESSING APPARATUS CONTROL METHOD, INFORMATION PROCESSING PROGRAM, AND NETWORK SYSTEM

(75) Inventor: Masanori Aritomi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 324 days.

(21) Appl. No.: 11/653,942

(22) Filed: Jan. 17, 2007

(65) Prior Publication Data
US 2007/0174521 A1    Jul. 26, 2007

(30) Foreign Application Priority Data

Jan. 20, 2006  (JP)  ............................. 2006-013088
Dec. 8, 2006   (JP)  ............................. 2006-332612

(51) Int. Cl.
*G06F 3/00*    (2006.01)
*H04L 5/02*    (2006.01)

(52) U.S. Cl. .......................................... 710/5; 370/252
(58) Field of Classification Search ............... 710/5; 370/252
See application file for complete search history.

(56) References Cited

U.S. PATENT DOCUMENTS

| | | | |
|---|---|---|---|
| 7,131,775 B2 | 11/2006 | Uchida et al. | |
| 7,168,868 B2 | 1/2007 | Uchida et al. | |
| 7,253,911 B2 | 8/2007 | Aritomi | |
| 2002/0180822 A1 | 12/2002 | Aritomi | |
| 2003/0117638 A1* | 6/2003 | Ferlitsch | ............ 358/1.13 |
| 2005/0088701 A1 | 4/2005 | Uchida et al. | |
| 2005/0094570 A1* | 5/2005 | Berthy | ............ 370/252 |
| 2006/0066907 A1 | 3/2006 | Nakata et al. | |
| 2006/0147236 A1 | 7/2006 | Uchida et al. | |
| 2007/0216939 A1 | 9/2007 | Wada et al. | |

FOREIGN PATENT DOCUMENTS

| | | |
|---|---|---|
| JP | 2000215128 | 8/2000 |
| JP | 2004038956 | 2/2004 |
| JP | 2004280218 | 10/2004 |
| JP | 2004362594 | 12/2004 |

\* cited by examiner

*Primary Examiner*—Henry W. H. Tsai
*Assistant Examiner*—Hyun Nam
(74) *Attorney, Agent, or Firm*—Fitzpatrick, Cella, Harper & Scinto

(57) ABSTRACT

An information processing apparatus communicable with a peripheral device and a terminal is provided. The information processing apparatus receives information about the peripheral device from the peripheral device and saves the information, counts the sharing rate of each peripheral device by counting, for each peripheral device, message information transmitted/received between the terminal and the peripheral device, receives, from the terminal, a request message to request the information about the peripheral device, and transmits, to the terminal, information about a peripheral device selected in accordance with a sharing rate of each peripheral device when the request message is received.

9 Claims, 32 Drawing Sheets

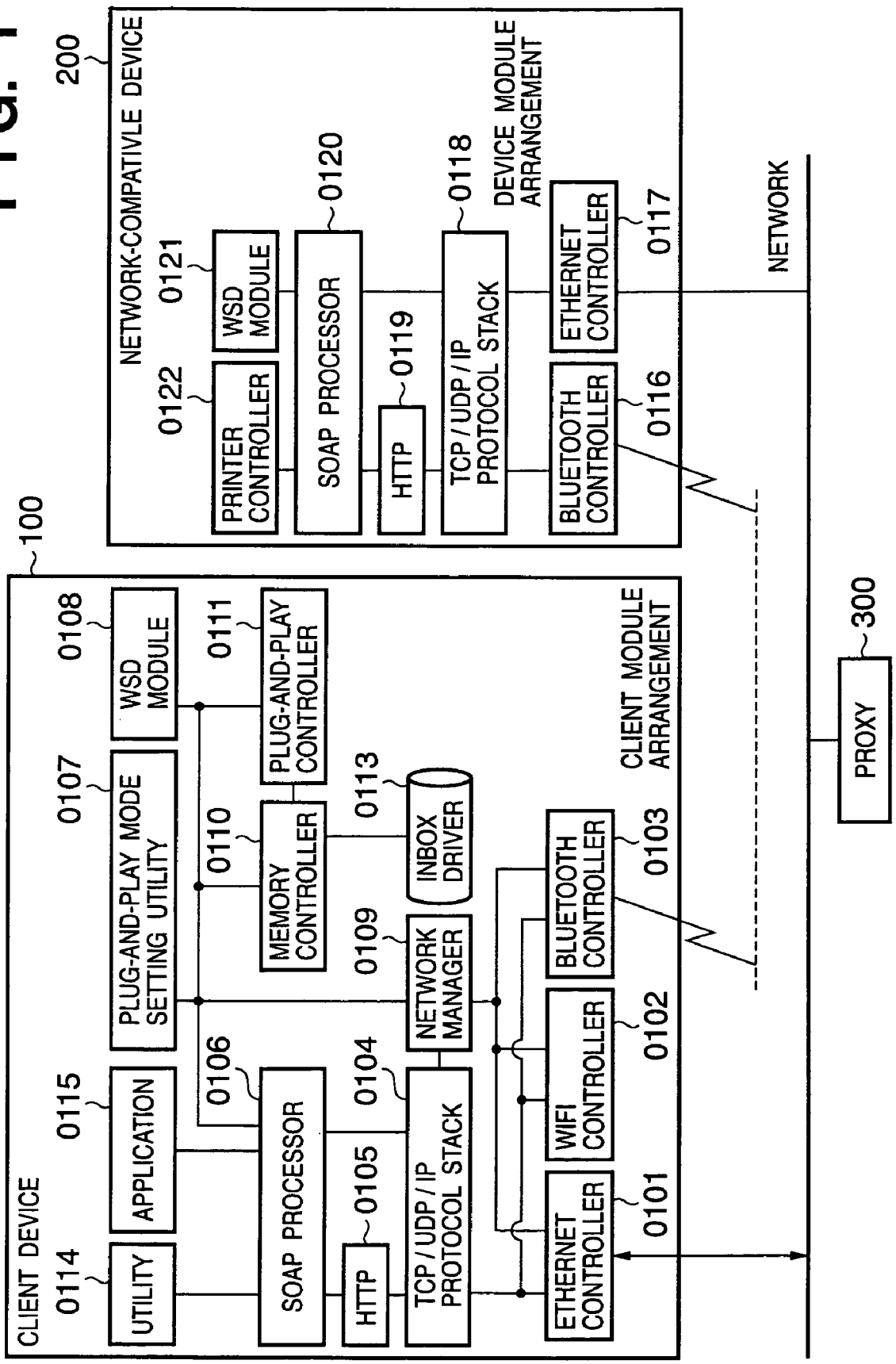

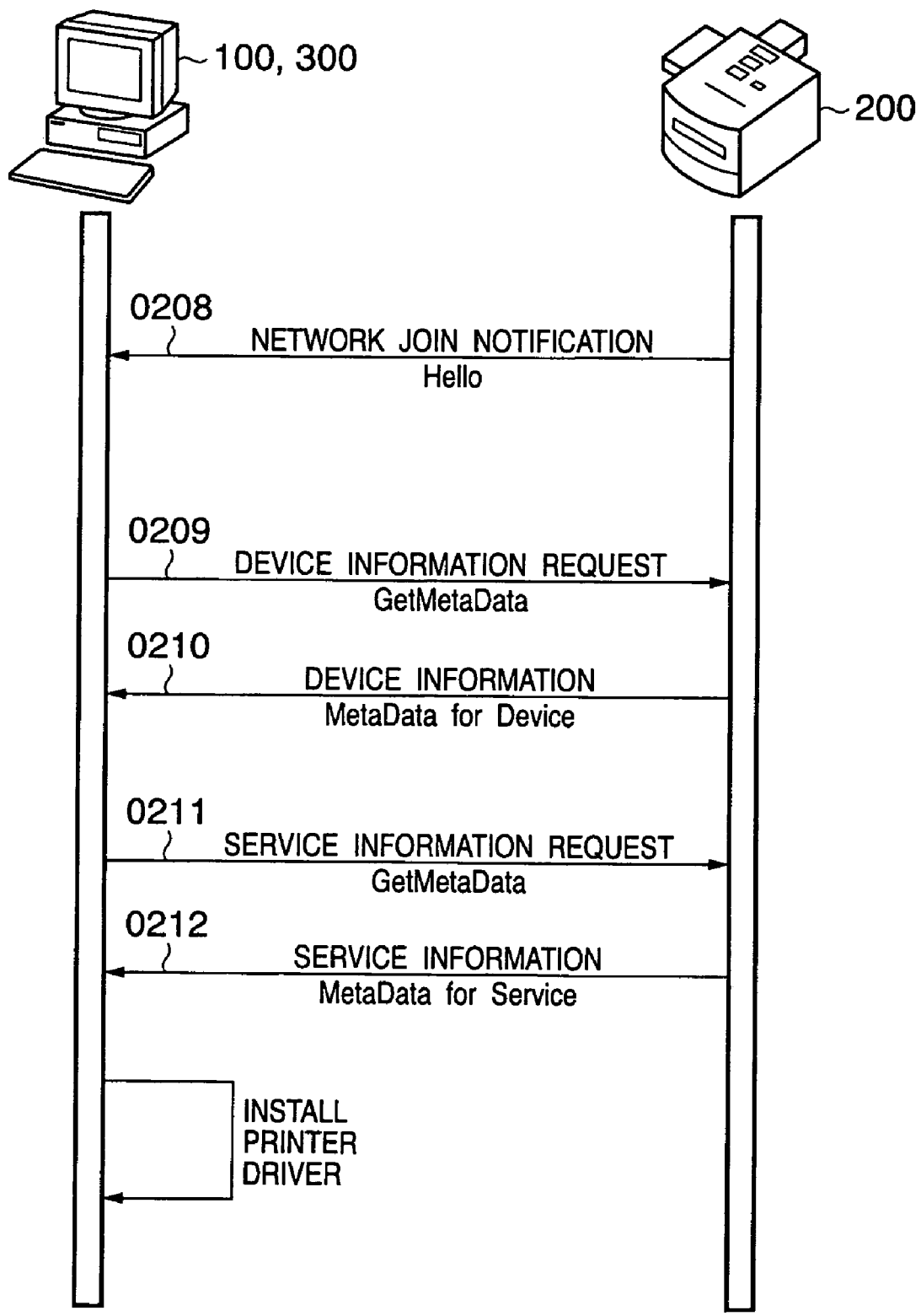

FIG. 9A

| 0901 | NUMBER OF CONNECTION DESTINATIONS | DATA AMOUNT | NUMBER OF LOCAL USERS | CAPABILITY VALUE |
|---|---|---|---|---|
| DEVICE 1 | 60 | 180 | 120 | 12 |
| DEVICE 2 | 12 | 150 | 90 | 10 |
| DEVICE 3 | 3 | 15 | 8 | 2 |
| DEVICE 4 | 1 | 4 | 2 | 1 |

| 0901 | NUMBER OF CONNECTION DESTINATIONS | NUMBER OF SEARCHES | NUMBER OF INFORMATION REQUESTS | DATA AMOUNT PER MONTH | DATE AND TIME OF FIRST CONNECTION | DATE AND TIME OF LATEST CONNECTION | NUMBER OF HELD SERVICES | ... |
|---|---|---|---|---|---|---|---|---|
| DEVICE 1 | 60 | 180 | 120 | 200 | 020601 | 050509 | 12 | |
| DEVICE 2 | 12 | 150 | 90 | 120 | 020601 | 050509 | 10 | |
| DEVICE 3 | 3 | 15 | 8 | 30 | 020501 | 050426 | 2 | |
| DEVICE 4 | 1 | 4 | 2 | 5 | 040924 | 050414 | 1 | |

FIG. 13

| PRINTER NAME | INFORMATION | 1301 |
|---|---|---|
| ■ 1. Ganon iR Cxxxx.Print | ... | |
| ■ 2. Ganon iR xxxx.Print | | |
| ■ 3. Ganon LBP-xxxx.Print | | |
| ■ 4. Ganon LBP-xxxx.Print | | |
| □ 5. Ganon LBP-xxxx.Print | | |
| □ ... | | |

OK    CANCEL

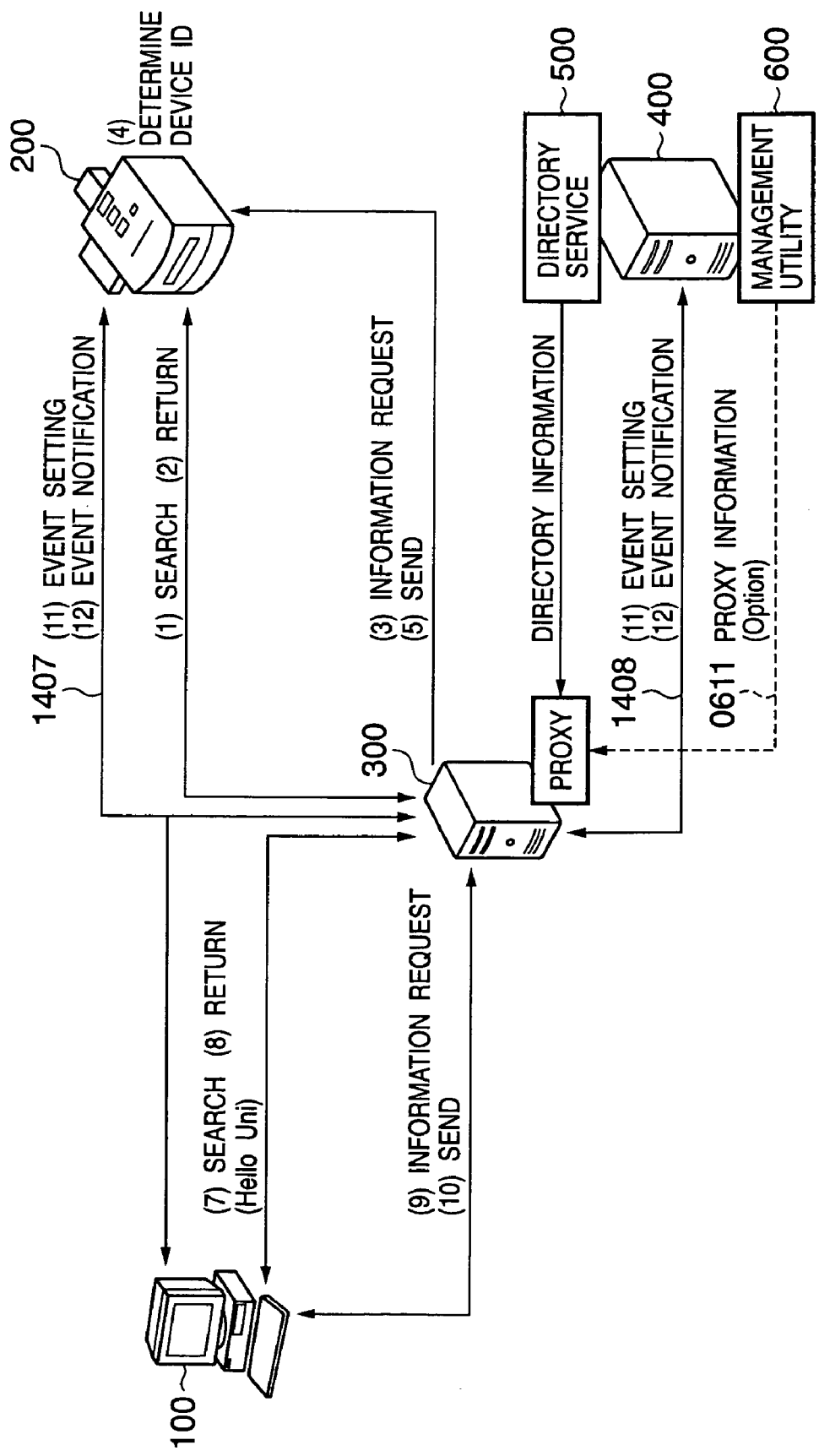

FIG. 16
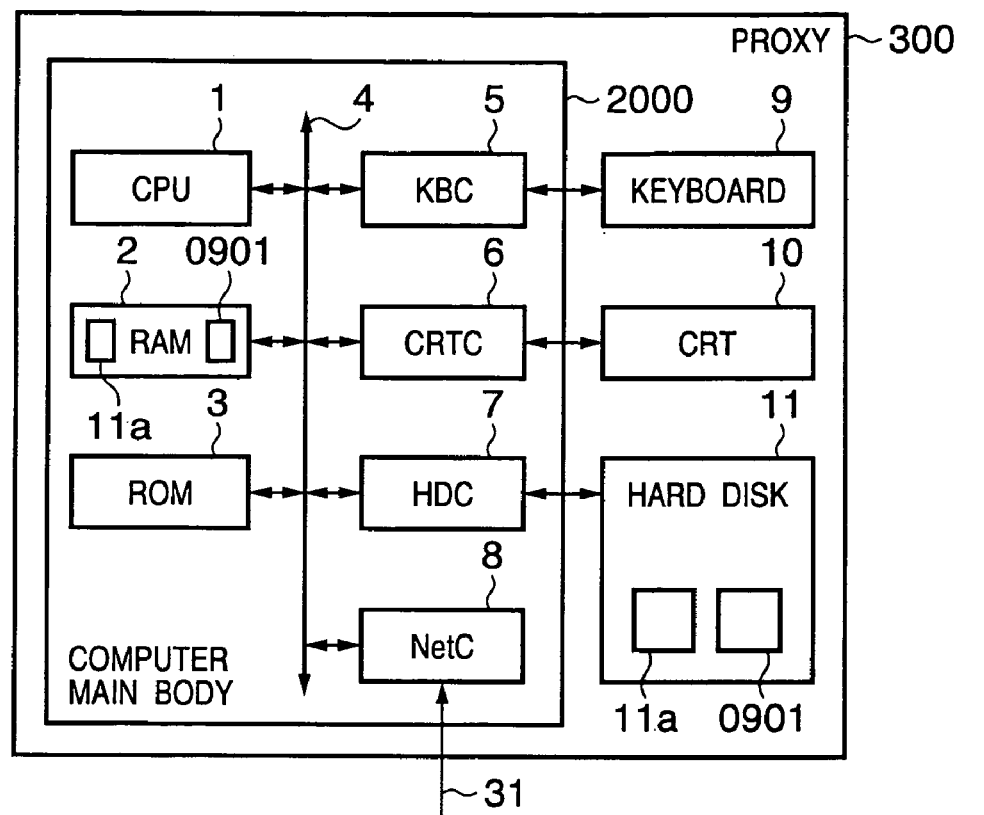
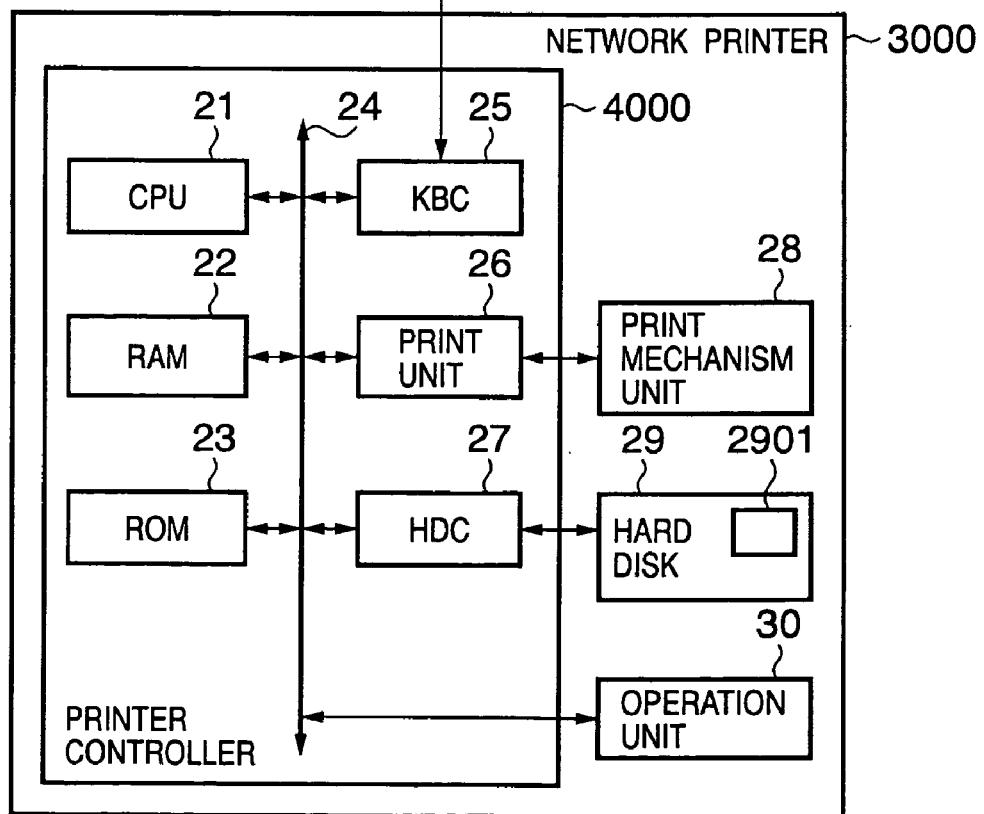

FIG. 19

| DEVICE NAME | CLIENT ID | ADDRESS INFORMATION |
|---|---|---|
| CLIENT 200 | CLIENT A | ADDRESS 101 |
| CLIENT 201 | CLIENT B | ADDRESS 102 |
| CLIENT 202 | CLIENT C | ADDRESS 103 |

FIG. 20

| DEVICE NAME | DEVICE ID | ADDRESS | DEVICE TYPE | SERVICE | URI |
|---|---|---|---|---|---|
| DEVICE 200 | DEVICE A | DEVICE AA | PRINTER | PDL_A | URI-A |
| DEVICE 201 | DEVICE B | DEVICE BB | PRINTER | PDL_B | URI-B |
| DEVICE 202 | DEVICE C | DEVICE CC | PRINTER | PDL_C | URI-C |
| DEVICE 203 | DEVICE D | DEVICE DD | MONOCHROME PRINTER | PDL_A | URI-D |
| DEVICE 204 | DEVICE E | DEVICE EE | PRINTER | PDL_B | URI-E |
| DEVICE 205 | DEVICE F | DEVICE FF | COLOR PRINTER | PDL_B | URI-F |

FIG. 21

| DEVICE NAME | DEVICE ID | ADDRESS | DEVICE TYPE | SERVICE | URI |
|---|---|---|---|---|---|
| DEVICE 200 | DEVICE A | DEVICE AA | PRINTER | PDL_A | URI-A |
| DEVICE 203 | DEVICE D | DEVICE DD | MONOCHROME PRINTER | PDL_A | URI-D |
| DEVICE 201 | DEVICE B | DEVICE BB | PRINTER | PDL_B | URI-B |
| DEVICE 205 | DEVICE F | DEVICE FF | COLOR PRINTER | PDL_B | URI-F |
| DEVICE 202 | DEVICE C | DEVICE CC | PRINTER | PDL_C | URI-C |
| DEVICE 204 | DEVICE E | DEVICE EE | PRINTER | PDL_B | URI-E |

FIG. 22

| DEVICE NAME | DEVICE ID | ADDRESS | DEVICE TYPE | SERVICE | URI |
|---|---|---|---|---|---|
| DEVICE 200 | DEVICE A | PROXY***;DEVICE AA | PRINTER | PDL_A | URI-A |
| DEVICE 203 | DEVICE B | PROXY***;DEVICE BB | PRINTER | PDL_B | URI-B |
| DEVICE 201 | DEVICE C | PROXY***;DEVICE CC | PRINTER | PDL_C | URI-C |

SELECT DEVICE AS TARGET OF SERVICE
INFORMATION REQUEST

■ PRINTER 1

■ PRINTER 2

☐ PRINTER 3

☐ PRINTER 4

☐ PRINTER 5

|  | PRINTER 1 | PRINTER 2 | PRINTER 3 | PRINTER 4 | PRINTER 5 |
|---|---|---|---|---|---|
| NUMBER OF MESSAGE REQUESTS | 15 | 23 | 12 | 8 | 18 |

SELECT DEVICE AS TARGET OF SERVICE
INFORMATION REQUEST

■ PRINTER 2

■ PRINTER 5

■ PRINTER 1

☐ PRINTER 3

☐ PRINTER 4

OK

INFORMATION PROCESSING APPARATUS, INFORMATION PROCESSING APPARATUS CONTROL METHOD, INFORMATION PROCESSING PROGRAM, AND NETWORK SYSTEM

BACKGROUND OF THE INVENTION

1. Field of the Invention

The present invention relates, for example, to a peripheral device compatible to a network, an information processing method and apparatus for controlling the peripheral device, and a program thereof.

2. Description of the Related Art

Monitoring and management processing for shared printers in a network environment is usually concentrated to an IT (Information Technology) manager and server, and users are notified of it through a mail service. Manual operations in a specific process of management are automated by replacing them with a mail service, thereby reducing the load on the IT manager and users. A server creates an installer and distributes mail with it. A user installs a network sharing printer by executing the installer (e.g., patent reference 1). The server sends mail to the user to notify him/her of the monitoring and deletion of the network sharing printer (e.g., patent reference 2).

On the other hand, along with enhancements of networks such as the Internet and home networks, network compatibility of user interactive devices such as PDAs and portable phones and image processing devices such as scanners, printers, copy machines, and digitals camera has advanced. Also, network compatibility of various devices including electronic home appliances such as a televisions, air conditioners, and refrigerators has advanced. In order to improve convenience and to allow easy management using such network compatible devices, various protocols and architectures that provide functions of managing network devices have been proposed (patent references 3 and 4). The functions to be provided include a search function of network devices which provide services, an automatic setup function of application software, utility software, an operating system, and the like required to control network εdevices.

An attempt to automate network device management has also been made. For example, development of UPnP® and WSD: Web Services for Devices (WS-Discovery/WS-MetadataExchange) has been done by Microsoft. Such technique implements so-called plug-and-play that allows use of a device by connecting that device to the network.

Monitoring and management processing for shared printers in a network environment is concentrated to an IT (Information Technology) manager and server, and users are notified of it through a mail service. There is disclosed a technique of automating manual operations in a specific process of management by replacing them with a mail service, thereby reducing the load on the IT managers and users (patent reference 4). A server described in patent reference 4 creates an installer and distributes mail with it. A user installs a network sharing printer by executing the installer.

[Patent Reference 1] Japanese Patent Laid-Open No. 2000-215128

[Patent Reference 2] Japanese Patent Laid-Open No. 2004-280218

[Patent Reference 3] Japanese Patent Laid-Open No. 2004-038956

[Patent Reference 4] Japanese Patent Laid-Open No. 2004-362594

However, the convenience of network devices improves due to prevalence of plug-and-play in the network devices, while negative effects resulting from automatic installation of drivers of devices connected to the network are also produced. One of such negative effects is an unlimited increase in number of drivers introduced (installed) in a client computer.

For example, if device drivers are installed automatically, even a device driver unnecessary for the user may be installed. This makes it difficult for the user to select a desired network device. In addition, a print instruction may be sent to a device that has rarely been chosen and used in the past as a desired device.

SUMMARY OF THE INVENTION

The present invention has been made to solve the above-described problems, and has as its object to select a device with a high sharing rate from network devices detected by a network plug-and-play function and notify the user of it.

In order to achieve the above object, the present invention has the following arrangement. That is, there is provided an information processing apparatus communicable with a peripheral device and a terminal, comprising:

a saving unit which receives information about the peripheral device from the peripheral device and saves the information;

a count unit which counts the sharing rate of each peripheral device by counting, for each peripheral device, message information transmitted/received between the terminal and the peripheral device;

a reception unit which receives, from the terminal, a request message to request the information about the peripheral device, which is held by the saving unit; and a response unit which transmits, to the terminal, information about a peripheral device selected in accordance with the sharing rate of each peripheral device obtained by the count unit when the reception unit receives the request message.

There is also provided an information processing apparatus communicable with a peripheral device and a terminal, comprising:

a saving unit which receives function information about the peripheral device from the peripheral device and saves the function information;

a first response unit which transmits the function information saved by the saving unit to the terminal upon receiving, from the terminal, a first message to request the function information about the peripheral device;

an update unit which updates the priority of a recommendable device based on the number of the first messages received from the terminal;

a reception unit which receives, from the terminal, a second message to request a list of recommendable peripheral devices; and a second response unit which transmits, to the terminal, a list of peripheral devices determined based on the priority updated by the update unit when the reception unit receives the second message.

According to the present invention, even when a computer is connected to a network including a plurality of network devices, it is possible to notify the user of a limited number of devices with a high usage probability.

Further features of the present invention will become apparent from the following description of exemplary embodiments with reference to the attached drawings.

BRIEF DESCRIPTION OF THE DRAWINGS

FIG. 1 is a block diagram showing the configuration of a network plug-and-play system according to an embodiment of the present invention;

FIGS. 2A and 2B are sequence charts showing a search control process from a client to a device;

FIGS. 9A and 9B are views showing a device sharing rate ranking table according to the present invention;

FIG. 13 is a view showing an example of a setting UI when the proxy server 300 individually selects a device;

FIG. 14 is a view showing a process when the plug-and-play system has a message reference function;

FIG. 16 is a block diagram of a client and a device;

FIG. 19 is a table showing an example of a client list held by the proxy server 300;

FIG. 20 is a table showing an example of a device list held by the proxy server 300;

FIG. 21 is a table showing an example of a device list that reflects sharing rate ranking information;

FIG. 22 is a table showing an example of device information transmitted to the client;

FIG. 25 is a view showing an example of a device list displayed in response to a device information request;

FIG. 26 is a table showing an example of a message request count managed by the proxy server 300;

FIG. 27 is a view showing an example of a device list displayed in response to a device information request;

DESCRIPTION OF THE EMBODIMENTS

First Embodiment

Figure 2A:
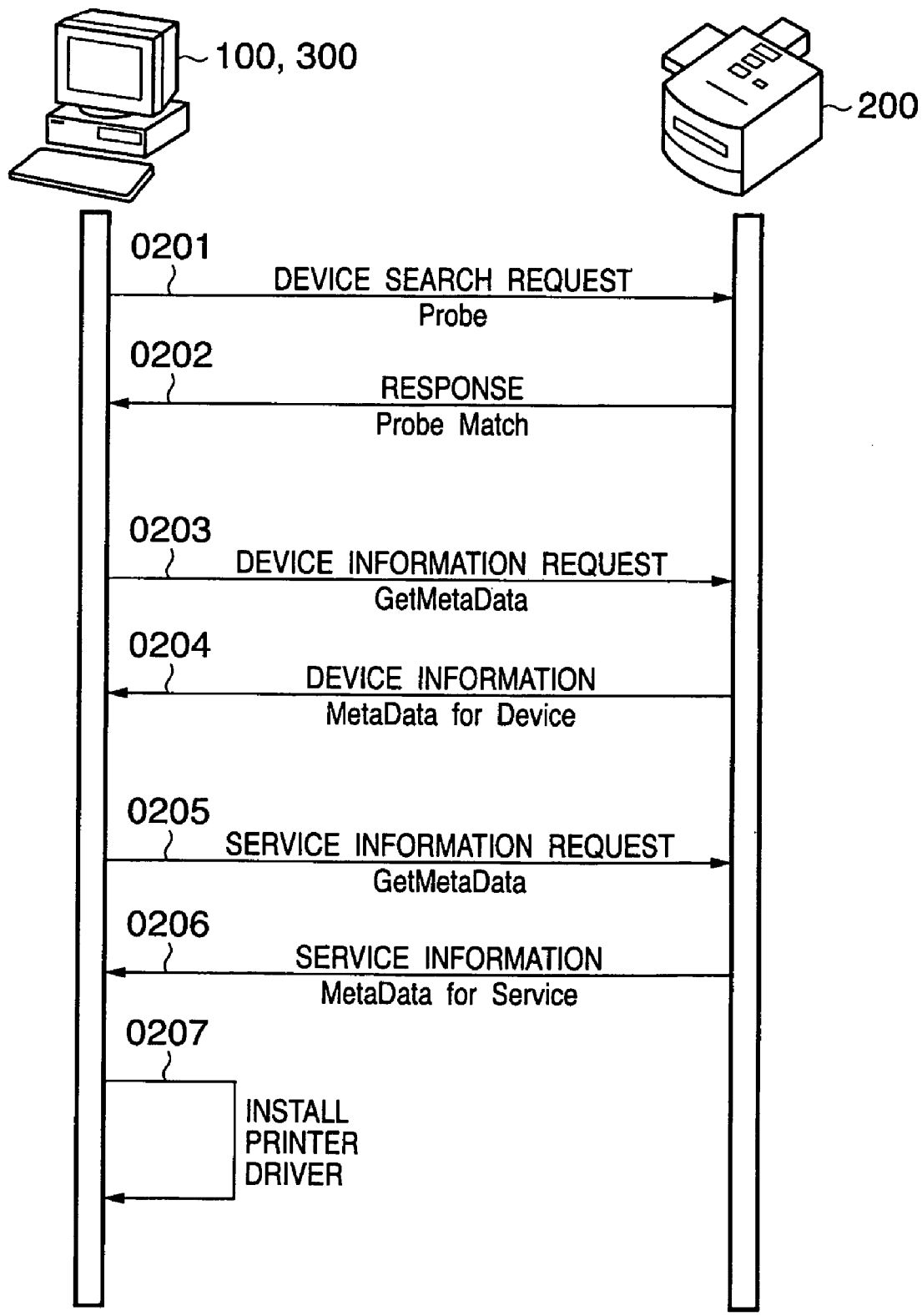

A preferred embodiment of the present invention will be described in detail hereinafter with reference to the accompanying drawings. Note that protocols, versions, addresses, numerical values, and the like described in the embodiment are merely examples, and the scope of the present invention is not limited to them unless otherwise specified.

<Basic Explanation of Connection Between Client and Device>

FIG. 1 is a block diagram showing the configuration of a network plug-and-play system according to an embodiment of the present invention. A client PC (also referred to as a client device) 100 is compliant to communication functions including a LAN such as Ethernet®, a wireless LAN such as WiFi® (IEEE80.11a/b/g), and BlueTooth®. An Ethernet® controller 0101, WiFi® controller 0102, and Bluetooth® controller 0103 control these communication functions, respectively. An upper layer of these controllers includes a TCP/UDP/IP protocol stack 0104. An HTTP processing unit 0105 is provided on the protocol stack. The HTTP processing unit 0105 analyzes an HTTP request and executes response processing.

An upper layer of the TCP/UDP/IP protocol stack 0104 and HTTP processing unit 0105 includes a Simple Object Access Protocol (SOAP) processor 0106. A plug-and-play mode setting utility 0107 implements two-way communication of data described in extensible Markup Language (XML) via the SOAP processor 0106. A WSD module 0108, utility 0114, and application 0115 have the same function as the plug-and-play mode setting utility 0107.

A network manager 0109 is a module that manages the Ethernet® controller 0101, WiFi® controller 0102, and Bluetooth® controller 0103. The network manager 0109 has a function of acquiring setting information of each controller and information associated with communication status.

The WSD module 0108 responds to a Hello message sent from a network device and issues a Probe message for network device search via the SOAP processor 0106. The WSD module 0108 acquires attribute information of a network device by issuing a GetMetadata message. A storage unit such as a hard disk provided in a device stores attribute information.

Attribute information of a network device contains the device ID of the device and a service ID provided by the device. A service indicates each function provided by the device. For example, if a device is a digital multifunctional peripheral having a print function and a scan function, information representing that a print service and a scan service are available is provided. If the print function is compatible to a plurality of PDLs, the print function is provided for each PDL as an independent service.

If the client PC 100 finds a network device by these message processes, the WSD module 0108 notifies a plug-and-play controller 0111 of the attribute information of the found network device. The plug-and-play controller 0111 has a function of loading, via a memory controller 0110, a relevant driver and utility software from a memory based on the attribute information and installing them.

The application 0115 is an application program such as a word processor. The application 0115 has a function of causing a network device printer to print an edited document. To do this, the application 0115 outputs document data and transmits it to a network-compatible device 200 via the driver and utility installed by the plug-and-play controller 0111.

On the other hand, the network-compatible device 200, i.e., network-compatible printer of this embodiment has the following arrangement. The network-compatible device 200 has a communication function compatible to Ethernet®, WiFi® (IEEE80.11a/b/g), and BlueTooth®. An Ethernet® controller 0116 and WiFi® controller 0117 control the communication functions. An upper layer of these controllers includes a TCP/

UDP/IP protocol stack 0118. An HTTP processing unit 0119 is provided on the protocol stack. The HTTP processing unit 0119 analyzes an HTTP request and executes response processing.

An upper layer of the TCP/UDP/IP protocol stack 0118 and HTTP processing unit 0119 includes a Simple Object Access Protocol (SOAP) processor 0120. A WSD module 0121 and printer controller 0122 can implement two-way communication of data described in extensible Markup Language (XML) via the processor.

The WSD module 0121 connected to a network through the SOAP processor 0120 sends a Hello message and responds a Probe message issued by the client PC 100.

The network-compatible device also returns attribute information (attribute information of the network-compatible printer of this embodiment) in response to a GetMetadata message issued by the client PC 100. The attribute information contains information (device information) of the device itself and information (service information) of a service provided by the device.

<Hardware Configuration of Print System>

FIG. 16 is a block diagram showing the hardware configuration of an information processing apparatus and a printer according to the embodiment of the present invention. In FIG. 16, a proxy server 300 connects to a printer 3000 serving as a network device via a network 31. In the proxy server 300, a keyboard 9, CRT 10, and hard disk 11 as external devices are connected to a computer main body 2000. The computer main body 2000 comprises a CPU 1 which can execute arithmetic operations by mapping, on a RAM 2, control programs and applications stored in a ROM 3 or the hard disk 11. A keyboard controller (KBC) 5 controls input from the keyboard 9 as an external device. A CRT controller (CRTC) 6 controls display on the CRT 10. A hard disk controller (HDC) 7 controls input/output to/from the hard disk 11. A network controller (NetC) 8 connects to the printer 3000 via the network 31 and controls communication with a printer controller 4000.

The CPU 1, RAM 2, ROM 3, KBC 5, CRTC 6, HDC 7, and NetC 8 are connected via a system bus. The CPU 1 systematically controls these devices. The HDD 11 saves a sharing rate ranking table 0901 including the ranks of sharing rates of network devices and, more particularly, network printers in this embodiment, and a list (device list or device information) 11a of device information and service information. The sharing rate ranking table 0901 includes the names (identifiers) of network devices connected to the proxy server 300 and information (to be described later with reference to, e.g., FIG. 17) collected by the proxy server 300. The device list 11a and sharing rate ranking table 0901 are saved on the hard disk 11 and loaded into the RAM 2 when the CPU 1 needs to access them. The sharing rate ranking table will also be referred to as sharing rate ranking information. The device list 11a in the HDD 11 or RAM 2 functions as a saving unit. The sharing rate of a device indicates the number of clients that have used the device. Note that repeated counting of the same client is inhibited. In this embodiment, the sharing rate is a composite index that combines the number of clients and other indices, as shown in FIGS. 9A and 9B.

This embodiment assumes a personal computer (PC) as the proxy server 300. That is, the proxy server 300 is an information processing apparatus. However, the proxy server 300 is not limited to a PC as long as it can carry out the present invention, and a portable information terminal such as a PDA, a portable phone, or digital home appliances may be used as the client. Any of these devices has the same arrangement as that of the proxy server 300 shown in FIG. 1, except for input and output devices for specific use.

In the network printer 3000, a printer CPU 21 executes control programs stored in the program area of a ROM 23. Upon execution of the control programs, the printer CPU 21 systematically controls access to various devices connected to a bus 24 to output an image signal as print data to a print mechanism unit 28 (printer engine) connected via a print unit 26.

The printer CPU 21 can execute communication processing with the proxy server 300 and the client PC 100 (not shown) via a network controller (NetC) 25. The printer CPU 21 can notify the proxy server 300 and client PC 100 of information in the network printer 3000. A RAM 22 serves as the main memory and work area of the printer CPU 21. The RAM 22 also serves as a bitmap memory and video signal information storage area to store print data and image bitmap data received from the client PC 100 (not shown). A hard disk 29 controlled by a hard disk controller 27 is used for BOX storage of print job data. An operation panel 30 is a user interface used by the user to operate the network printer 3000 and includes a touch panel type liquid crystal panel in addition to various kinds of switches and LED indicators.

The hard disk 29 stores a configuration information database 2901 indicating the configuration of the printer 3000. The configuration information database contains various kinds of data. The configuration information database 2901 contains information such as the foundation of device information and service information, including device type information, service information, device use frequency information, device function information, and manufacturer information. Device function information includes print speed information, color function information indicating the presence/absence of a color print function, highest resolution information, and double-sided printing function information indicating the presence/absence of a double-sided print function. Device type information indicates a device type such as a single-function printer or copying machine. Service information indicates a service provided by a device of a certain type. For example, for a printer, information representing a PDL type such as postscript® is registered as service information. In this embodiment, a PDL type is represented by a URI.

Note that the network printer 3000 can be either a single-function printer or a multi-function printer having scanner, copy, and facsimile functions if it can carry out the functions of the present invention. The functions of the present invention are not limited by the print mechanism unit 28 which adopts any of print systems such as a laser beam printer, a printer using an ink-jet print mechanism, or a thermal printer. The client PC shown in FIG. 1 have the same hardware configuration as the information processing apparatus 300 in FIG. 16.

<Device Search Procedure>

The sequence of control when the client PC 100 searches for the network-compatible device 200 usable on the network will be described with reference to the chart in FIG. 2A. The same sequence as in FIGS. 2A and 2B is executed even between the proxy server 300 and the network-compatible device 200. The proxy server 300 collects device information and service information from the network-compatible device 200 through the sequence shown in FIGS. 2A and 2B and saves the information in, for example, the hard disk 11 as the device list 11a.

Step 0201:

The utility 0114 or application 0115 of the client PC 100 requests the SOAP processor 0106 to transmit a Probe message. This process is triggered, for example, by power on. In response to this request, the SOAP processor 0106 generates a Probe message and multicasts it to a multicast address 239.255.255.250 via the protocol stack 0104. Network device search processing is implemented based on the presence/absence of a Probe Match message as a response from the network-compatible device 200 to the transmitted Probe message.

Step 0202:

The network-compatible device 200 receives the Probe message and sends it to the SOAP processor 0120 via the TCP/UDP/IP protocol stack 0118. The SOAP processor 0120 analyzes the contents of the Probe message and sends the result (message contents) to the WSD module 0121. The WSD module 0121 determines whether the received message contents match the function provided by the network-compatible device 200. If it is determined that the contents do not match the function, the information is neglected. In this case, the network-compatible device 200 does not issue a Probe Match response. If it is determined that the contents do match the function, the WSD module 0121 requests the SOAP processor 0120 to issue a Probe Match message. The SOAP processor 0120 generates a Probe Match message and unicasts it to the client PC 100 via the protocol stack 0118.

Steps 0203 and 0205:

The client PC 100 receives the Probe Match message and sends it to the SOAP processor 0106 via the TCP/UDP/IP protocol stack 0104. The SOAP processor 0106 analyzes the contents of the Probe Match message and sends the result to the WSD module 0108. The WSD module 0108 requests the SOAP processor 0106 to issue a GetMetadata message to be sent to the address described in the Probe Match message. The GetMetadata message is a request to acquire the attribute information of the network-compatible device 200 that has issued the Probe Match message. The SOAP processor 0106 generates a GetMetadata message and unicasts it to the network-compatible device 200 via the protocol stack.

In step 0205, the client PC requests service information. The message exchange procedures in steps 0205 and 0203 are the same except that the requested information is device information or service information.

Steps 0204 and 0206:

The network-compatible device 200 receives the GetMetadata message and sends it to the SOAP processor 0120 via the TCP/UDP/IP protocol stack 0118. The SOAP processor 0120 analyzes the contents of the GetMetadata message and sends the result to the WSD module 0121. The WSD module 0121 requests the SOAP processor 0120 to issue a GetMetadataResponse message to return the designated attribute information to the client of the transmission source of the GetMetadata message. The SOAP processor 0120 generates a GetMetadataResponse message and unicasts it to the client via the protocol stack. "GetMetadataResponse message" includes device information and service information transmitted from the device 200.

The message processing procedures in steps 0204 and 0206 are the same except that the information transmitted from the device 200 is device information or service information.

Step 0207:

The client PC 100 receives the GetMetadataResponse message and sends it to the SOAP processor 0106 via the TCP/UDP/IP protocol stack 0104. The device attribute information described in the GetMetadataResponse message is sent to the WSD module 0108 via the SOAP processor 0106 of the client PC 100.

The WSD module 0108 activates the plug-and-play controller 0111 and sends the device attribute information to it. Upon receiving the device attribute information, the plug-and-play controller 0111 searches for a driver program coincident with the device attribute information from the storage device via the memory controller and installs the detected driver. If the OS is Windows®, installation can be done by a standard installer by preparing an installation file that describes, for example, the installation location. Alternatively, the driver may be paired with the installer. When the device driver is provided by a server connected to the client PC 100 via the network, the driver program is searched for on the server.

<Device Join Notification Procedure>

The procedure of control when the network-compatible device 200 that is newly introduced starts network communication or the network-compatible device 200 in a power OFF state is powered on and resumes network communication will be described with reference to the chart in FIG. 2B.

Step 0208:

When the network-compatible device 200 starts or resumes communication on the network, the WSD module 0121 requests the SOAP processor 0120 to transmit a Hello message. This process is triggered, for example, by power on. The SOAP processor 0120 generates a Hello message and multicasts it to a multicast address 239.255.255.250 via the protocol stack.

Step 0209:

The client PC 100 receives the Hello message and sends it to the SOAP processor 0106 via the TCP/UDP/IP protocol stack 0104. The SOAP processor 0106 analyzes the contents of the Hello message and sends the result (message contents) to the WSD module 0108. The WSD module 0108 requests the SOAP processor 0106 to issue a GetMetadata message to be sent to the address described in the Hello message to acquire the attribute information of the network device that has issued the message. The SOAP processor 0106 generates a GetMetadata message and unicasts it to the network-compatible device 200 via the TCP/UDP/IP protocol stack 0104. The subsequent process is the same as that from step 0204 of device search in FIG. 2A, and a description thereof will be omitted.

Figure 5:
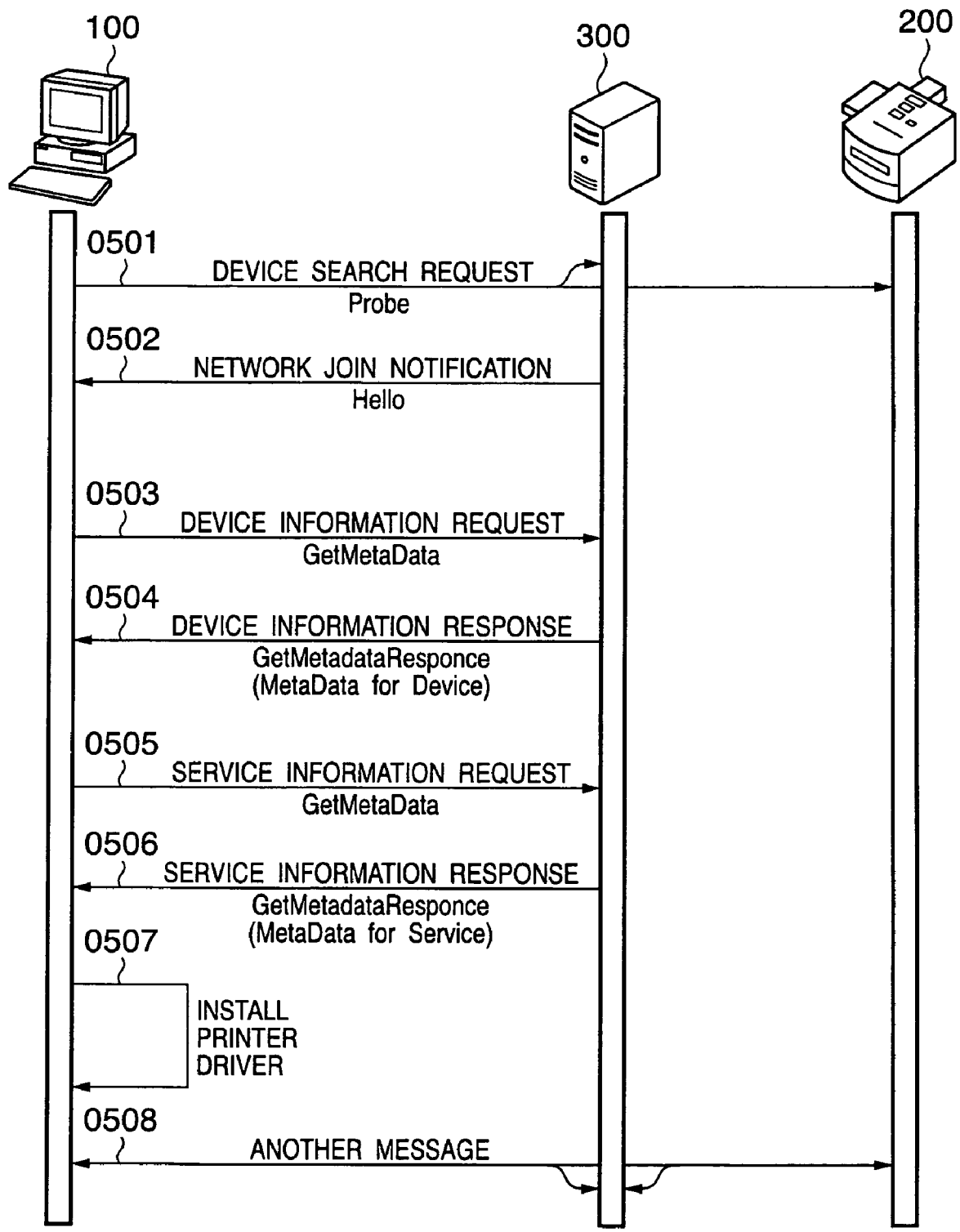
FIG. 5 is a sequence chart showing a connection process using a proxy server 300.

When the client PC 100 is replaced with the search proxy server 300 shown in FIG. 5, the procedure in FIGS. 2A and 2B is executed between the search proxy server 300 and the device 200. Hence, on the network where the search proxy server 300 exists, the search proxy server 300 collects the device information and service information of a network device and saves and manages the information as the device list 11*a*. The proxy server 300 also hooks (i.e., intercepts) other messages and counts them in correspondence with each destination device, service, or transmission source client. A sharing rate ranking table is generated and saved based on the counter.

<Format of Metadata>

The format of metadata (Metadata) transmitted from the device to the client PC (also called a client terminal) 100 in FIGS. 2A and 2B will be described with reference to FIG. 3. Metadata is described in the XML. The first metadata is device information 0301. The device information 0301 contains a model name 0301*a* and vender name of the device. The device information contains a link 0301*b* to service information.

The second metadata is service information 0302. In the example shown in FIG. 3, the service information 0302 is metadata of PDL_A. That is, "MFP200.PDL_A (0302*a*)" is described in the service information 0302. This description indicates that the device, i.e., MFP 200 provides a service PDL_A, i.e., the MFP 200 can interpret PDL_A (page description language A). The service information stores a device ID and a service ID contained in the device information in this way. The device ID is used for plug-and-play. This also applies to service information 0303 of PDL_B and service information 0304 of PDL_C.

Figure 3:
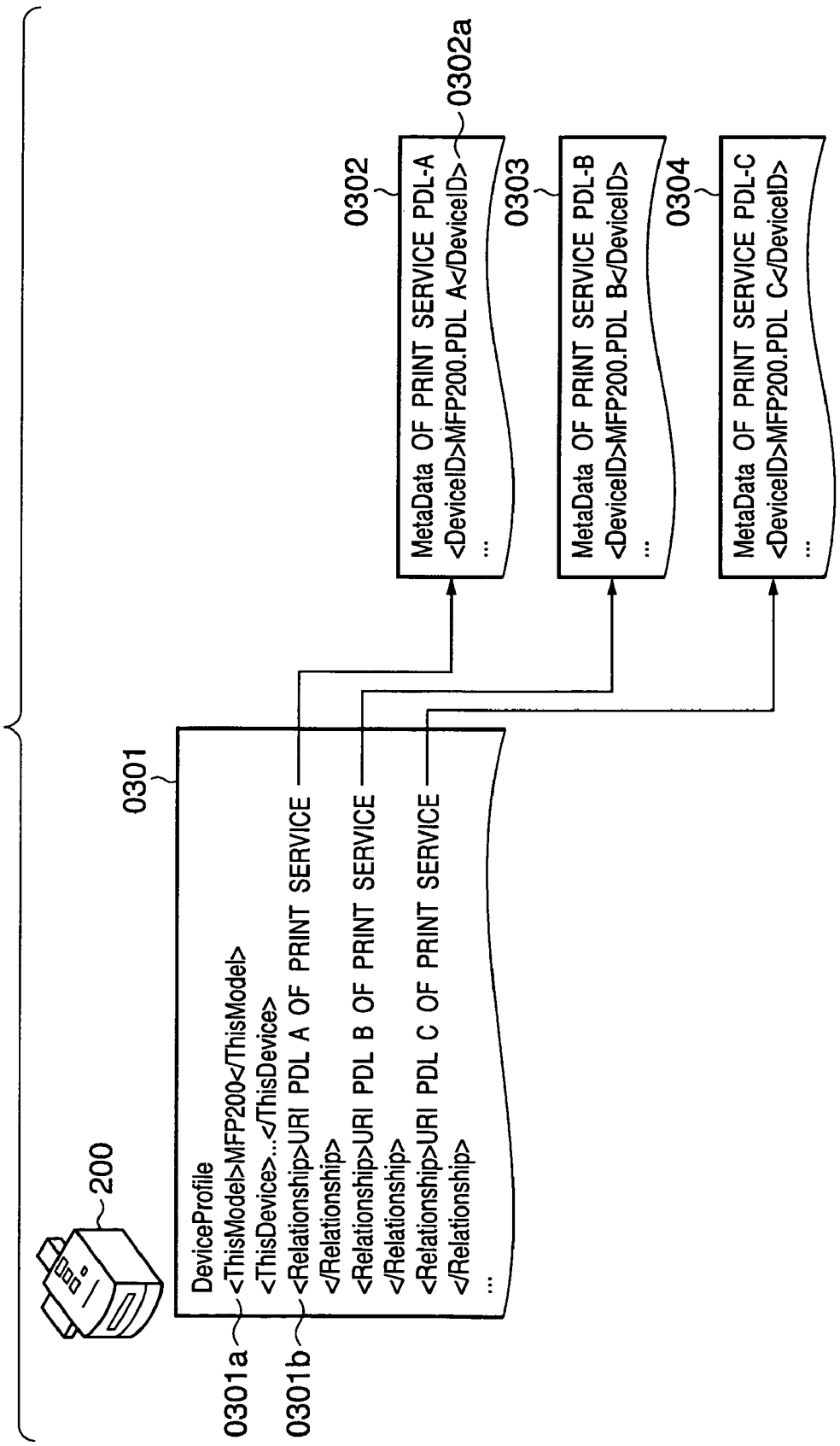
FIG. 3 is a view showing the format of metadata.

In the example in FIG. 3, the device information 0301 contains links to the metadata 0302 to 0304 of PDL_A to PDL_C. In, for example, step 0205 of FIG. 2A or step 0211 of FIG. 2B, service information is requested by designating the address (link destination) obtained from the device information.

<Contents of Probe Match Message>

Figure 4:
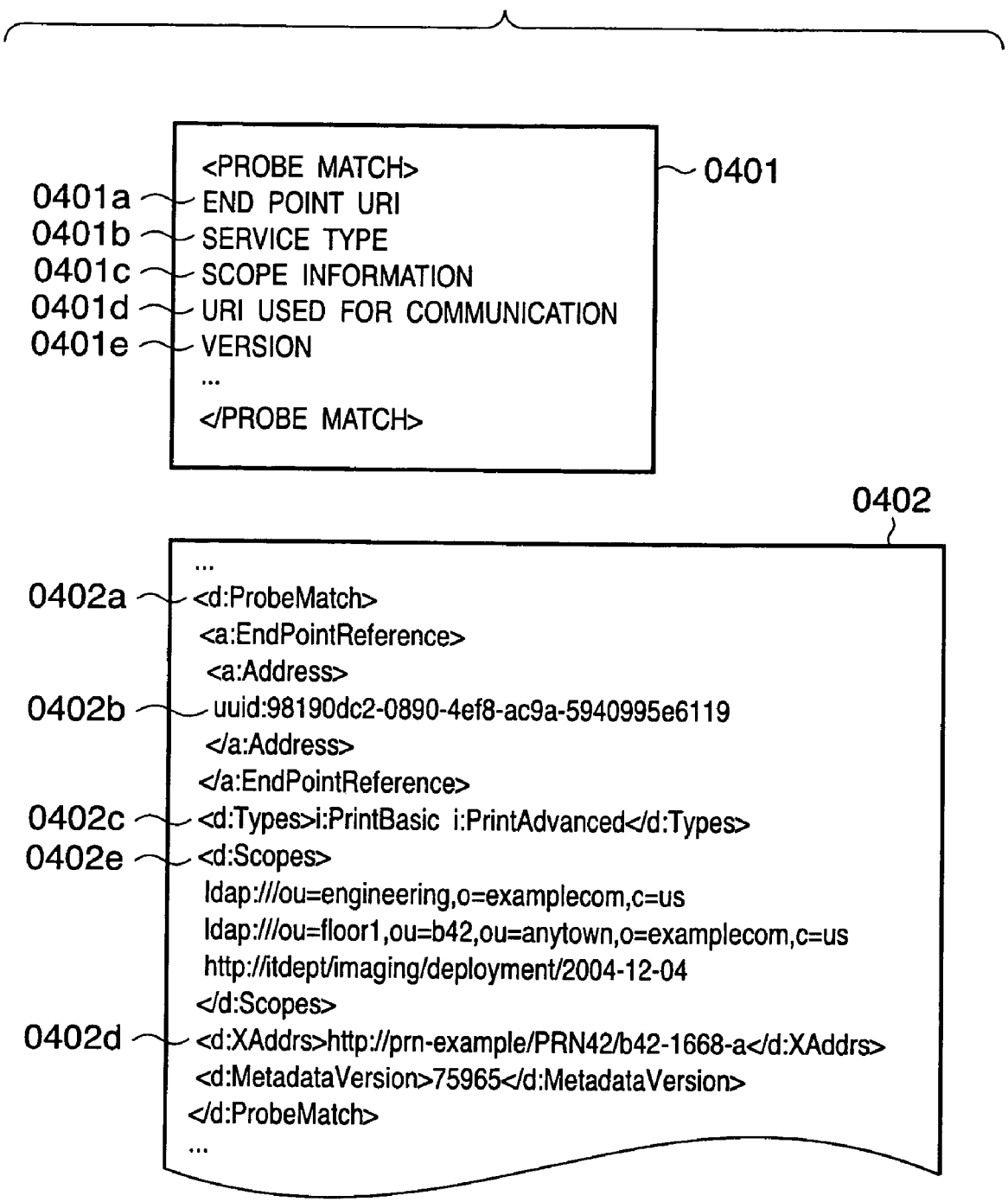
FIG. 4 is a view showing the contents of a Probe Match message.

The contents of a Probe Match message 0401 will be described with reference to FIG. 4. The Probe Match 0401 contains an end point URI 0401a serving as the address of a terminal, information about a service type 0401b and a network scope 0401c, a URI 0401d used for communication, and version information 0401e of the metadata. The version information 0401e is incremented upon updating the contents. A message 0402 is an example of the Probe Match message. The Probe Match message is described in the XML and contains a tag 0402a indicating that the message is a Probe Match message, a terminal address 0402b, and device type 0402c. The device type indicates the type of a device such as a printer.

<Connection of Search Proxy Server 300>

FIGS. 2A and 2B show the connection procedure of the client PC 100 and device 200. A connection procedure when the search proxy server 300 is installed in addition to the configuration in FIGS. 2A and 2B will be described with reference to FIG. 5.

As described above, the device 200 that will join the network connected to the search proxy server 300 receives, for example, a device request message from the search proxy server 300. The message contains information representing that the transmission source is not the client but the search proxy server 300. This information is identification information such as an ID assigned to the search proxy server 300 in advance. Upon receiving a message such as a device information request containing the identification information of the search proxy server 300, the network device 200 can determine that the search proxy server 300 exists on the network where the device 200 itself is joined. When the search proxy server 300 exists on the network, the device stores it in, for example, the memory. The device 200 that has stored the information representing the existence of the search proxy server 300 does not execute response processing even upon receiving a Probe message for device search from the client PC 100. The device search procedure progresses between the search proxy server 300 and the client PC 100, as will be described below. The device 200 transmits its device information and service information to the proxy server 300.

Step 0501:

The client PC 100 transmits a device search request message (Probe) 0501.

Step 0502:

The proxy server 300 sends a Hello message 0502. The client PC 100 receives the Hello message 0502 from the proxy server 300. The device 200 does not respond to the device search request message (Probe) 0501.

Steps 0503 to 0506:

The client PC 100 that has received the response from the search proxy server 300 and recognized its existence sends, from this point in time, a service search message to the search proxy server 300.

First, the client PC 100 transmits a GetMetadata message 0503 to the search proxy server 300 (step 0503). The GetMetadata message contains predetermined designation information such as "information about a color printer", "all pieces of device information held in the proxy server 300", and "three arbitrary printers on the network". Upon receiving the GetMetadata message 0503, the search proxy server 300 transmits a GetMetadataResponse message to the client (step 0504). The GetMetadataResponse message 0504 contains information (e.g., sharing rate ranking table) held in the search proxy server 300. This information is also transmitted to the client PC 100. In steps 0503 and 0504, device information is transferred to the client. In steps 0505 and 0506, service information is transferred to the client.

As described above, the device does not directly transfer device information and service information to the client. Instead, the pieces of information are cached by the search proxy server 300 and then transferred to the client.

Step 0507:

The client PC 100 installs a device driver based on the information received in step 0504 or 0506. A detailed description of this process has already been given in step 0207 of FIG. 2A and will be omitted here.

Step 0508:

Some other messages are exchanged between the three parties. For example, a print request message is directly transmitted from the client PC 100 to the device (printer) 200. The device 200 executes print processing in accordance with the print instruction. If an event such as an error to interrupt the processing occurs, a message representing it is transmitted from the device 200 to the client PC 100. The proxy server 300 hooks a message from the client to the device, as will be described later with reference to FIG. 6. The proxy server 300 counts the hooked messages. Instead of simply counting the messages, the proxy server 300 counts the number of messages for each attribute. That is, the proxy server 300 counts the number of clients for each device, the number of clients for each device and service, and the number of clients for each scope.

As described above, the search proxy server 300 facilitates service search by the client PC 100. In addition, the network traffic and processing on the device side are decreased by concentrating inquiries to one destination. Especially when a number of services are present in one network scope, the above-described arrangement can effectively reduce the system traffic. Fundamental connection of the client and device and connection when the proxy server 300 is added have been described above. When the proxy server 300 is used, the client PC 100 can receive information on the device 200 even when the device 200 is powered off.

<Outline of Control by Proxy Server 300>

The outline of control by the proxy server 300 of this embodiment will be described next with reference to FIG. 6. In response to a message (e.g., device information request) from the client PC 100, the proxy server 300 returns a device and service with a high sharing rate (with a high use frequency) in the network. Based on this response, a driver or application to use the service with a high sharing rate is set up on the side of the client PC 100. As a result, even in automatic installation, the client can introduce the device driver of a device that has a high sharing rate and is expected to become necessary. The proxy server 300 also identifies and records the individual device 200 and client PC 100 and controls routing based on the identification result. The message exchange procedure is shown in FIG. 5. A description will be made with reference to FIG. 6 including processing in the search proxy server 300.

Figure 6:
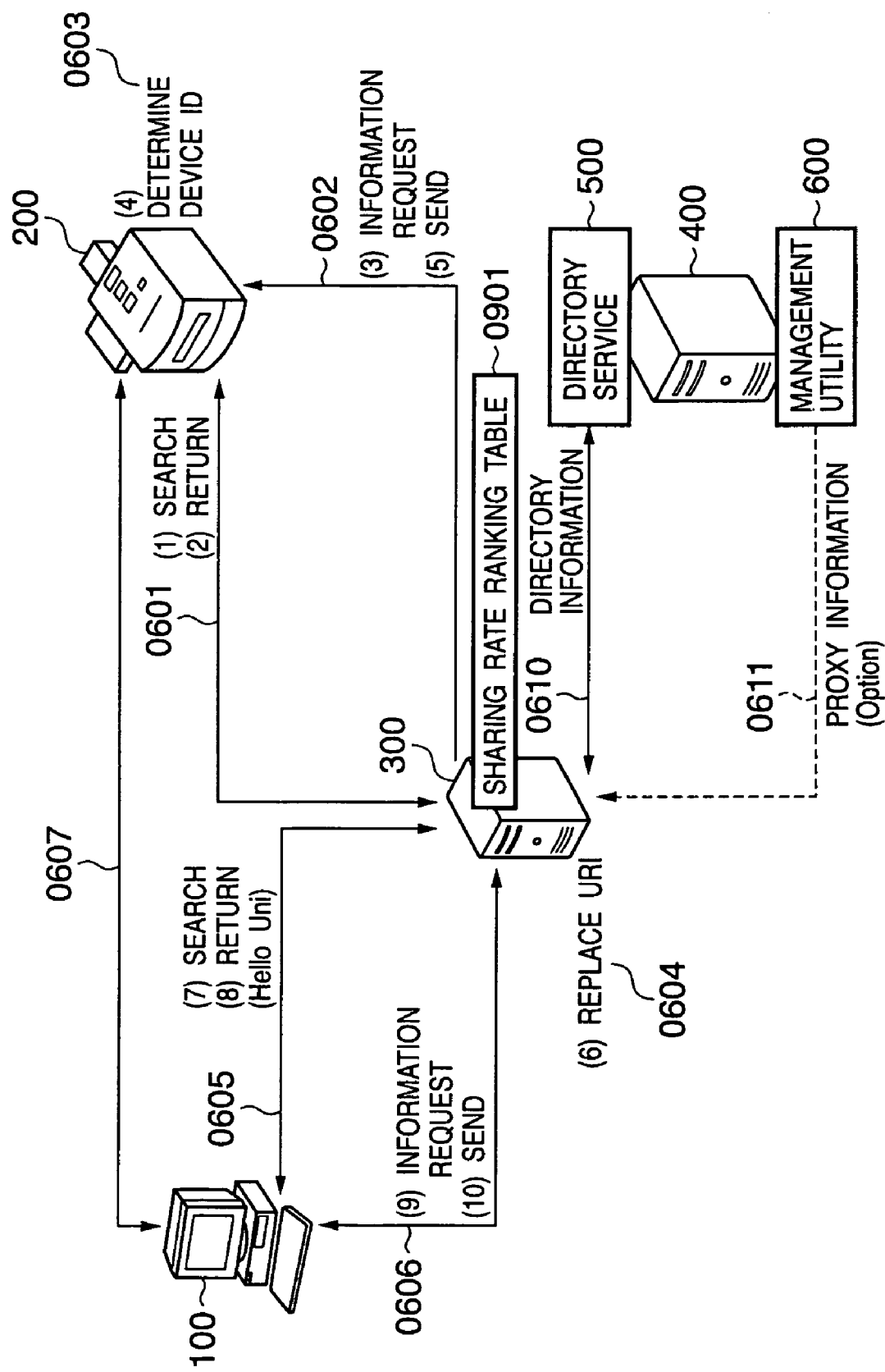
FIG. 6 is a view for explaining the outline of control of the proxy server 300 according to the present invention.

Referring to FIG. 6, individual identification and recording of devices including the MFP 200 by the proxy server 300 will be described. The proxy server 300 (1) transmits a search signal to the MFP device 200. Upon receiving the search signal, the MFP 200 (2) returns a response signal to the proxy server 300 (0601) The processing 0601 corresponds to steps 0201 and 0202 in FIG. 2A. It may be not the search and response but the network join notification 0208 in FIG. 2B.

The proxy server 300 in FIG. 6 (3) transmits an information acquisition request to the MFP 200 to acquire device information and service information. Upon receiving the information acquisition request, the MFP 200 (5) sends the device information and service information (0602). The processing 0602 corresponds to steps 0203 to 0206 in FIG. 2A or steps 0209 to 0212 in FIG. 2B. Upon receiving the information acquisition request, the MFP 200 (4) specifies the device ID (0603). By executing the series of processes 0601 to 0603, the proxy server 300 executes individual identification of devices by referring to the metadata 0301 (device information) and metadata 0302 (service information) in FIG. 3. Finally, the proxy server 300 saves, in the device list, the collected device IDs, device type information (device information) and provided service (service information) corresponding to each device ID. FIG. 20 shows device list information. The device list information shown in FIG. 20 holds the ID, address information, device type, service, and service URI of each device. Individual identification of devices indicates saving (registration) of device information and service information. When the whole metadata shown in FIG. 3 is the registration target, the registered metadata can directly be transferred to the client that is requesting device information or service information. As a result, the client can process the information, like metadata directly received from the device. In this embodiment, the device address (URI) of the metadata is changed because of the hook by the proxy server 300, as will be described later.

Individual identification and recording of the client PC 100 by the proxy server 300 will be described next. The proxy server 300 (7) transmits a search signal to the client PC 100 and (8) receives a response signal from the client PC 100 (0605). The proxy server 300 (9) transmits an information acquisition request to the client PC 100. In response to the information acquisition request from the proxy server 300, the client PC 100 (10) sends information about it (0606). By executing the series of processes 0605 and 0606, the proxy server 300 executes individual identification of the client PC 100. Finally, the proxy server 300 registers, in the database (called a client list), client information such as the collected client IDs and the addresses of the clients. FIG. 19 shows an example of the client list. The proxy server 300 stores the client ID and address information of each client, as shown in FIG. 19.

To determine the sharing rate, the proxy server 300 collects information contained in other messages transmitted/received in step 0508 of FIG. 5. For this purpose, the proxy server 300 executes network address conversion. This network address conversion processing will be described. Normally, GetMetadata discloses the information of a device and the address (URI) of a service to the client. From this point in time, the client executes an action (e.g., print request) at the address (URI). However, to generate the sharing rate ranking table 0901 in FIGS. 9A and 9B (to be described later), the proxy server 300 must collect information representing a client and a device (e.g., printer) used by the client for print processing. To temporarily capture a request message from the client to the device, the proxy server 300 rewrites the address (URI). Address conversion is done by replacing the URI contained in metadata such as service information transmitted from the proxy server 300 to the client PC 100 in the series of processes 0601 to 0606. The proxy server 300 executes address conversion processing in the process 0604 of FIG. 6. For example, in response to a device information request from the client PC 100 (step 0503 in FIG. 5), the proxy server 300 returns device information registered in the device list. At this time, the proxy server 300 adds its URI to the upper position of the URI of the device contained in the device information. Even for service information, the proxy server 300 adds its URI to the upper position of the URI of the device. In the example shown in FIG. 4, the URI of the proxy server 300 is added to the upper position of a URI 0402d of service information. The URI of the proxy server 300 may be added to only a URI used by the client as the address of a device.

Upon receiving the metadata after address conversion, the client uses the converted address (the URI of the proxy server 300) to transmit, for example, a print request message in step 0508 of FIG. 5. Hence, the message from the client PC 100 reaches the proxy server 300. The proxy server 300 transfers the message to the MFP 200 by removing the URI of the proxy server 300 from the upper position of the URI contained in the message (metadata) received from the client PC 100. With this processing, all messages sent from the client PC 100 to the device 200 pass through the proxy server 300. In this way, the proxy server 300 hooks a message from the client to the device. Address conversion can be implemented not only by the above-described method of adding/removing an address but also by conversion based on a conversion table or by using an address conversion function managed by another device. That is, the proxy server 300 intercepts a message from a terminal to a peripheral device. The proxy server 300 counts the number of messages and the sharing rate by using the intercepted message information. Sharing rate information representing the count result will be described later with reference to FIGS. 9A and 9B.

As described above, the proxy server 300 can refer to messages and metadata (message 0508 in FIG. 5) basically passing through the route 0607. When a server 400 connects to the network, the proxy server 300 transmits/receives necessary information to/from a directory service 500 and management utility 600 provided by the server 400. Scope information is also contained in Probe Match metadata. However, if the proxy server 300 requires directory information, transmission/reception to/from the directory service 500 is done in step 0610 of FIG. 6. If the management utility 600 and proxy server 300 share information, transmission/reception to/from the management utility 600 is done in step 0611.

<Internal Arrangement of Proxy Server 300>

The internal arrangement of the proxy server 300 will be described with reference to FIG. 7 next to the description of the main configuration and control of the system. The proxy server 300 has a three-layer structure including a communication unit 0701, flow unit 0702, and management unit 0703. The communication unit 0701 comprises a client connection unit 0704, server connection unit 0705, and device connection unit 0706 connected to the client, server, and device, respectively.

To execute procedure control, the flow unit 0702 comprises an address conversion unit 0707 and input/output unit 0708 to execute address conversion and input/output control described with reference to FIG. 6. The management unit 0703 comprises a data storage unit 0710 to record data, a setting operation unit 0711, and a determination unit 0709 to determine detailed processing for communication and control. The data storage unit 0710 records an identification result (including the device list 11a and client list) 0710a of the above-described device and client. The data storage unit 0710 also records an address conversion table 0710b, proxy operation setting 0710c (to be described later), track record table 0710d, and sharing rate ranking table 0901 (not illustrated in FIG. 7). The setting operation unit 0711 provides a UI (User Interface) for changing the operation of the proxy server 300 and processing of reflecting the operation result on the data storage unit 0710. The determination unit 0709 executes determination associated with the device sharing rate based on the data storage unit 0710 including settings of the proxy server 300 and inputs/track records. The determination result is transmitted to the outside of the proxy server 300 through the flow unit 0702 and communication unit 0701 as an output.

The communication unit 0701, flow unit 0702, and management unit 0703 have extension parts 0712 to 0714. When the extension parts 0712 to 0714 execute, for example, processing (extension processing) corresponding to another message 0508 in FIG. 5, the independence of fundamental processing and extension processing increases so that the extension processing contents can easily be changed, added, or deleted. This is because units for internal concentration of processing, internal replacement, and external connection can be employed as the extension parts 0712 to 0714.

Figure 7:
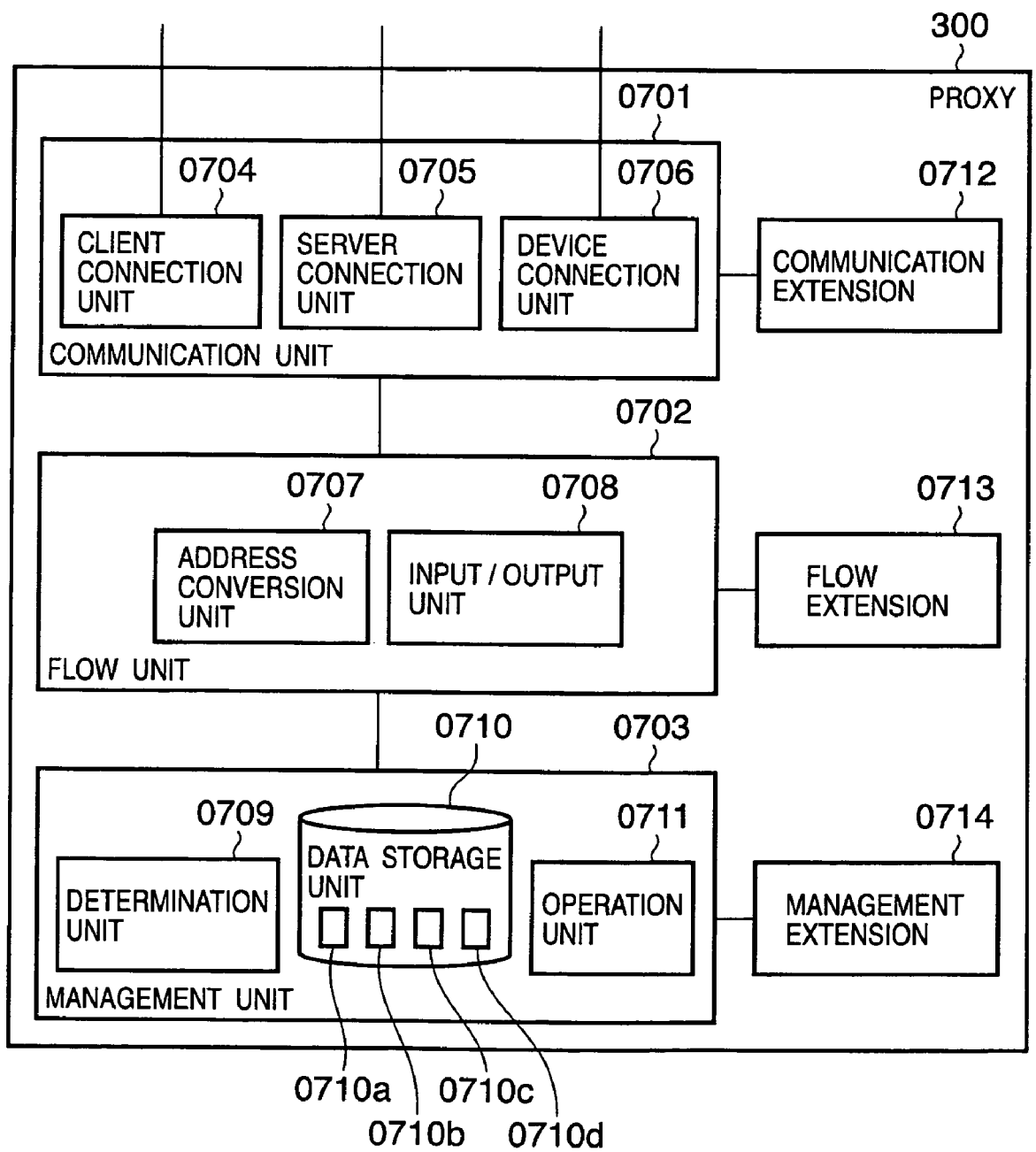
FIG. 7 is a block diagram showing the internal arrangement of the proxy server 300 according to the present invention.

The proxy server 300 having the internal arrangement shown in FIG. 7 can separately arrange the communication system and the management system. When the proxy server 300 and the above-described management utility 600 operate in cooperation, the proxy server 300 may be divided at the I/F between the flow unit 0702 and the management unit 0703 to concentrate the function of the management unit 0703 to the management utility 600.

The outline of processing of the proxy server 300 of the present invention will be described next with reference to FIG. 23. The CPU of the proxy server 300 executes the processing in each step of the flowchart in FIG. 23. The proxy server 300 is an information processing apparatus capable of communicating with a peripheral device (to be simply referred to as a device) and terminal (to be referred to as a client).

The proxy server 300 sends, to the network, a device search request described in the processes 0601 and 0605 of FIG. 6 and waits for a response from the device or client. The proxy server 300 receives a response from the client or device and requests device information based on the response information. The proxy server 300 generates the device list and client list based on the returned device information (S2301). In this way, the proxy server 300 receives, from the peripheral device, information about it and saves the information in step S2301.

The proxy server 300 generates sharing rate ranking information based on communication information between the client and the device or communication information between the client and the proxy server 300 (S2302).

An example of the process in step S2302 will briefly be described. The proxy server 300 counts, for each device, message information transmitted/received between the client and the device. The proxy server 300 counts the sharing rate of each peripheral device obtained by counting the message information, thereby generating sharing rate information. The proxy server 300 sometimes counts information transmitted from the client to the proxy server 300. The proxy server 300 executes the process in step S2302 when the network is in a normal operation state. Step S2302 will be described later in detail with reference to FIGS. 17 and 8.

The proxy server 300 determines whether a device information request is received from the client (S2303). More specifically, the proxy server 300 determines whether a request message to request information about peripheral devices, which is held in the memory of the proxy server 300, is received from the client. The proxy server 300 receives, from the client, a request message (device information request) to request information about peripheral devices, which is held in the memory of the proxy server 300. Upon receiving the message, the proxy server 300 transmits, to the client, information about peripheral devices selected in accordance with the sharing rates of the peripheral devices counted in step S2302 (S2304). That is, the proxy server 300 selects information about peripheral devices as a transmission target by using the generated sharing rate ranking information.

In the proxy server 300, conditions to select a device to be transmitted to the client are set. For example, information about three high-ranked devices of the sharing rate information is transmitted. Device information to be transmitted is determined on the basis of the conditions set in the proxy server 300.

The proxy server 300 that has received a device request from the client may determine whether information contained in the device information request received from the client matches the sharing rate information transmission conditions. The conditions used by the proxy server 300 to determine sharing rate information transmission will be described. The first condition is whether the device information request from the client contains information indicating that the client wishes to acquire sharing rate information. The second condition is whether the client has sent the device information request for the first time. The proxy server 300 manages device information requests from each client. That is, the proxy server 300 manages, for example, the transmission time, contents, and transmission source client of each device information request. If the proxy server 300 does not manage the client information of the transmission source of the device information-request received in step S2303, the proxy server 300 can determine that this is the first time the client has sent a device information request. Note that the sharing rate information transmission conditions are not limited to the above-described two examples.

Figure 23:
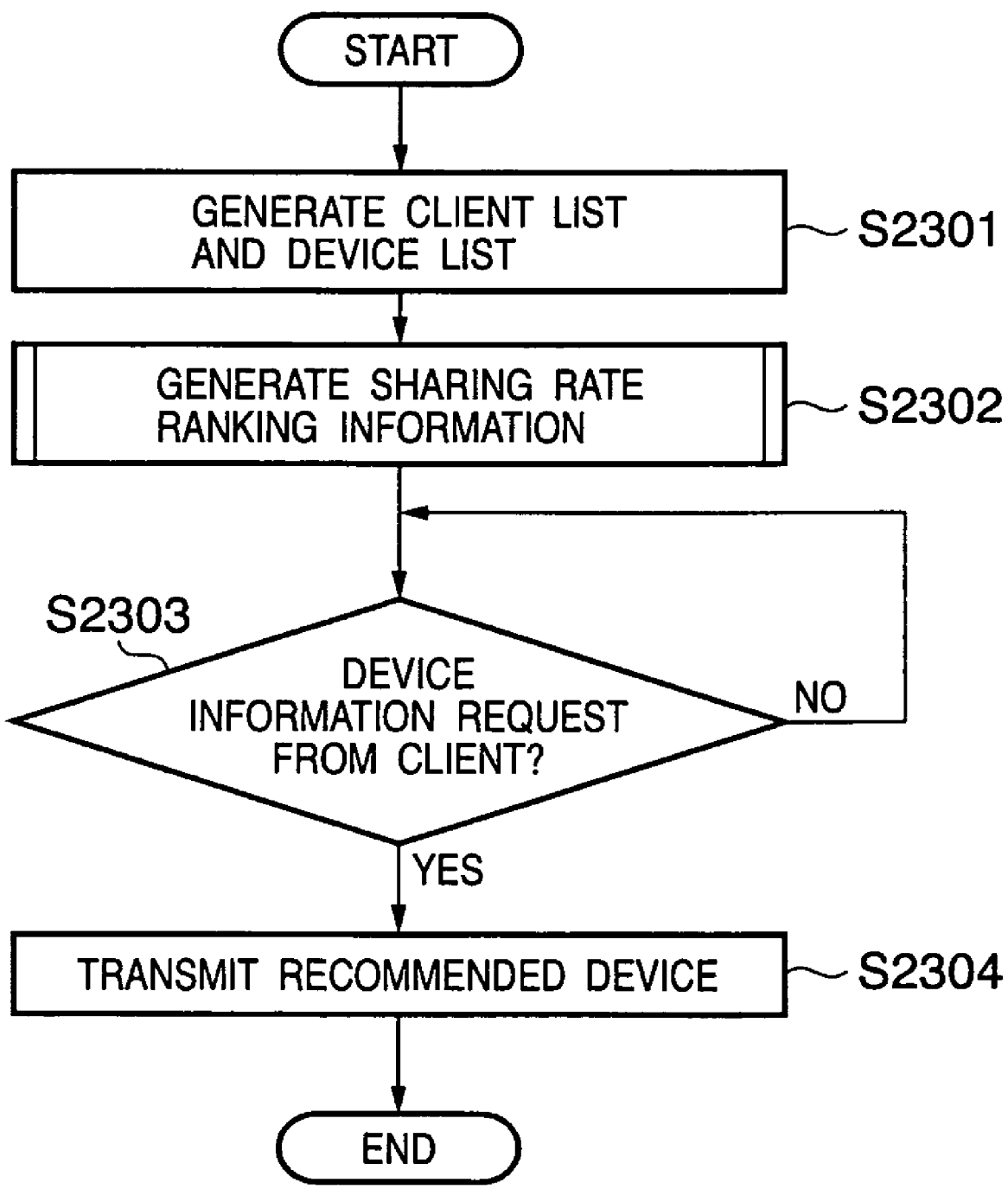
FIG. 23 is a flowchart for explaining processing of the proxy server 300.

The processing shown in FIG. 23 allows an information processing apparatus, which is capable of causing a client computer to selectively install, for example, the device driver of a device with a high probability of use or an application program corresponding to the device, to be provided.

<Totalization Processing by Proxy Server 300>

The proxy server 300 and, more specifically, the CPU 1 of the proxy server 300 totalizes information contained in received messages. Totalization is done for, for example, the following items.

(1) The number of clients which have accessed each device. The proxy server 300 receives messages from terminals to peripheral devices and counts, for each peripheral device, the number of terminals as transmission sources on the basis of the destination and transmission source information of each received message. The number of terminals is obtained by counting the number of messages concerned. The proxy server 300 associates the obtained number of terminals with each peripheral device and generates sharing rate ranking information representing sharing rate ranks sorted on the basis of the number of terminals.

(2) The number of messages from a specific client for each service. That is, a pair formed from the service ID (or the URI of a service) of a destination and the client ID (or address) of a transmission source is regarded as route information, and the number of messages in each route is counted. The proxy server 300 counts the number of messages for each peripheral device on the basis of the destination information of each received message. The proxy server 300 associates the obtained number of messages for each peripheral device with each peripheral device and, using the number of messages as a key, generates a sharing rate ranking representing ranks sorted on the basis of the number of messages.

(3) The amount of received and transmitted data for each device. In this embodiment, the amount of data is represented by the number of messages. Hence, it is also possible to obtain the amount of data by adding, for a device of interest, the number of messages from a specific client for each service (2).

(4) The number of messages in each scope. The proxy server 300 counts the number of terminals serving as transmission sources belonging to the same scope as the peripheral device on the network on the basis of the destination and transmission source information of each received message. The scope is described in metadata and indicates a range on the network. For example, a list of client IDs or a description of part (especially, an upper layer) of an address described hierarchically can express a scope. In this embodiment, even a client of a scope adjacent to a scope to which a device belongs can access the device. When access from a client belonging to the same scope as the device occurs, an item 914 representing the number of local users is counted. A client belonging to the same scope as a device is called a local client. The proxy server 300 associates the number of terminals as transmission sources belonging to the same scope on the network with each peripheral device and, using the number of terminals as a key, generates a sharing rate ranking representing ranks sorted on the basis of the number of terminals. The proxy server 300 can totalize various types of information, as required, in addition to the above-described items.

Figure 17:
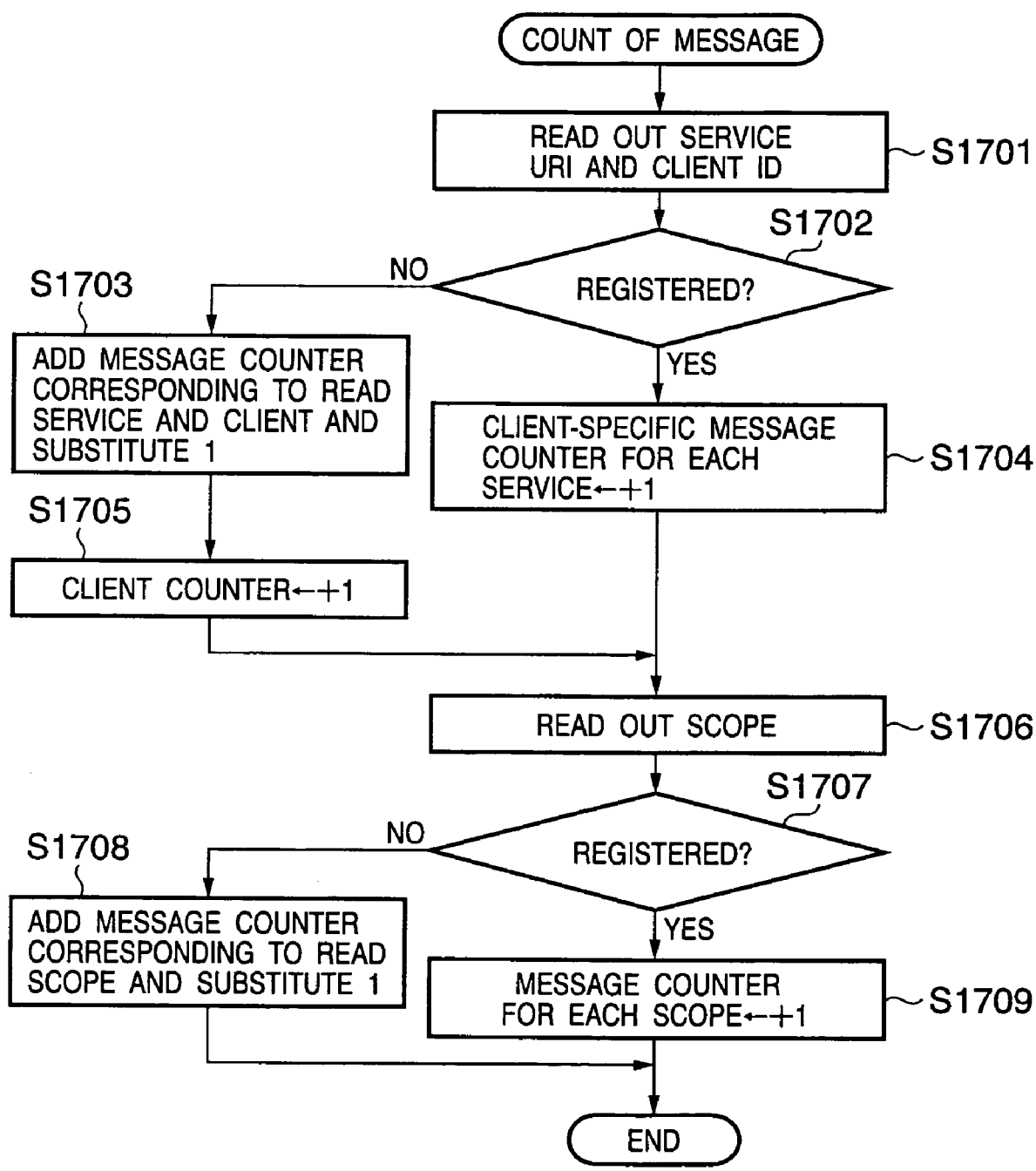
FIG. 17 is a flowchart showing a procedure of causing the proxy server 300 to totalize hooked messages.

FIG. 17 shows an example of processing executed by the proxy server 300 in step S2302 of FIG. 23. FIG. 17 shows a procedure for causing the proxy server 300 to count, for each device, message information transmitted/received between a client and a device. Referring to FIG. 17, the proxy server 300 counts hooked messages. In the example shown in FIG. 17, the proxy server 300 counts the number of clients for each device (1), the number of messages of a specific service and client for each device (2), and the number of messages of a specific client for each scope (4). The number of messages for each device (3) is calculated from the number of messages of a specific client for each device in generating the sharing rate table of devices (2). The CPU of the proxy server 300 executes the process in each step of FIG. 17.

In FIG. 17, the proxy server 300 reads out a device ID, service URI, and client ID from a hooked message (S1701). The proxy server 300 determines whether a counter (called a client-specific counter for each service) corresponding to the readout set of device ID, service URI, and client ID is registered (S1702). The counter, as the target of registration determination by the proxy server 300, is registered in its RAM. Hence, the proxy server 300 can execute the process in step S1702 by referring to the RAM.

If it is determined in step S1702 that the counter is registered, the proxy server 300 adds 1 to the message counter corresponding to the set of device ID, service URI, and client ID (S1704). If it is determined that no counter is registered, the proxy server 300 creates a new message counter corresponding to the readout set of device ID, service URI, and client ID and sets the message counter to 1 (S1703). If the client is new, the proxy server 300 adds 1 to the counter to count the number of clients for each device (S1705). The ID of the client is recorded to prevent a duplicate count.

Next, the proxy server 300 reads out a scope from the message (S1706). The proxy server 300 determines whether the message counter corresponding to the readout scope is registered (S1707). If the counter is registered, the proxy server 300 adds 1 to the message counter (S1709). If no counter is registered, the proxy server 300 creates a new message counter corresponding to the readout scope and sets the message counter to 1 (S1708).

<Sharing Printer Determination>

Figure 8:
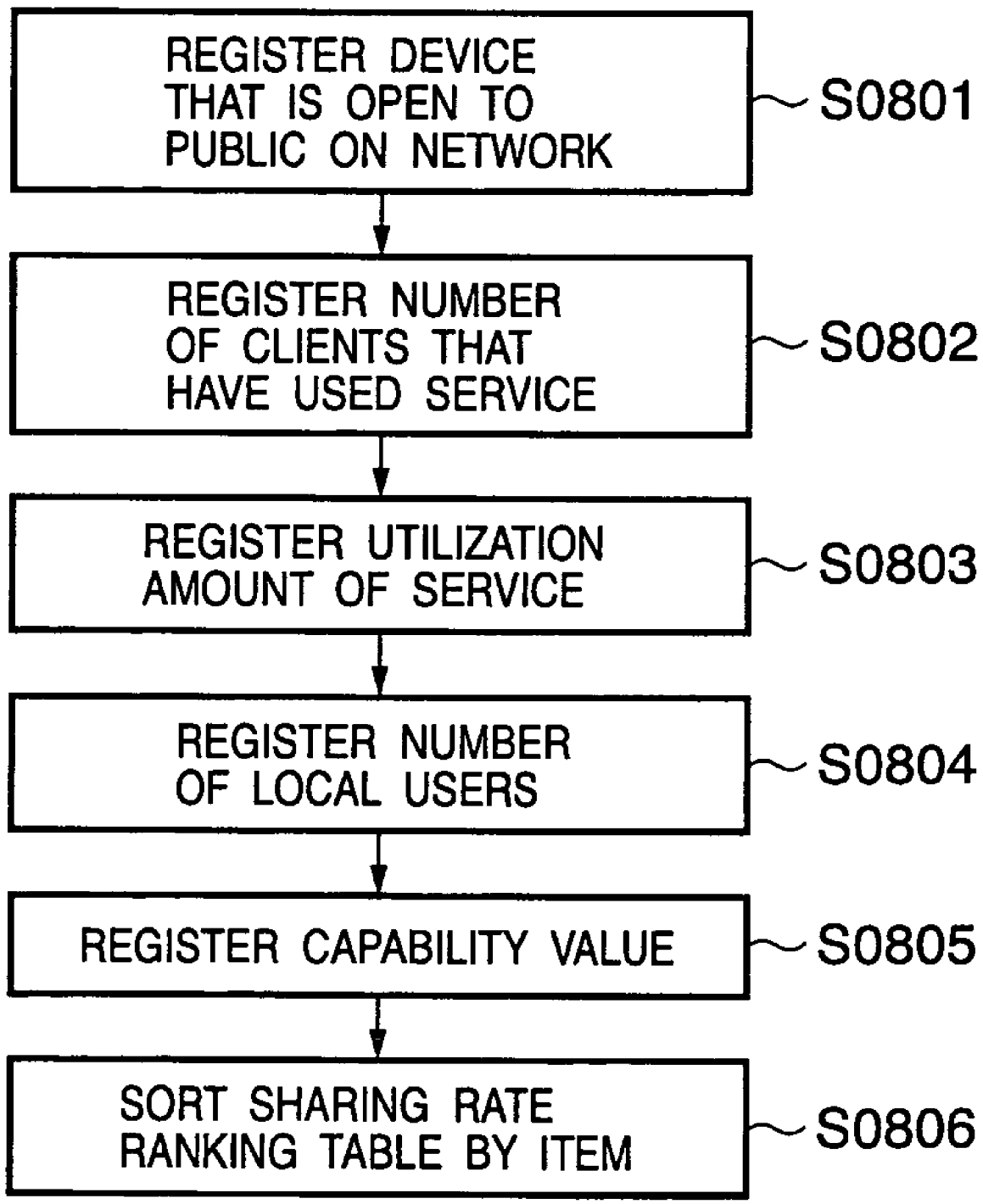
FIG. 8 is a flowchart of sharing rate determination according to the present invention.

Determination of the sharing rate of a network device such as a printer, which is executed by the determination unit 0709 in the management unit 0703 of the proxy server 300, will be described with reference to FIG. 8. FIG. 8 is a flowchart showing a device evaluation procedure and, more specifically, a device sharing rate ranking table generation procedure. That is, the processing in FIG. 8 is executed before response transmission from the proxy server 300 that has received a device information request from the client PC 100 in step S2302 of FIG. 23. FIG. 9A shows an example of the generated ranking table. In the processing procedure, steps S0801 and S0802 are the main determination steps, along with additional step S0803. Step S0804 is optional, and step S0805 is an auxiliary condition.

The determination unit of the proxy server 300 executes evaluation in steps S0801 to S0805 for each device registered in the device list and finally sorts the sharing rate ranking table in step S0806. This corresponds to a generation unit.

In step S0801, evaluation is done in accordance with the first criterion. The first criterion is whether a device is open to the public on the network. The determination unit determines whether OS sharing of the sharing rate ranking table is set on a device of interest (e.g., MFP 200). The criterion for this is information based on sharing information obtained from the directory service 500 as shown in step S0610. If the directory service 500 is an active directory, it is possible to acquire, from the directory via ADSI (Active Directory Service Interface), sharing information representing whether the sharing enabled for the device. If the determination unit determines that sharing is enabled, the proxy server 300 registers the device ID (device ID 0911 in FIG. 9A) of the device with sharing enabled in the sharing rate ranking table. In this embodiment, a device without sharing enabled is not registered in the sharing rate ranking table and cannot be found by a client using device search. This is because it is generally inappropriate to make unspecified users use devices without sharing enabled.

Information about the network scale such as the number of clients and the number of devices in the network environment can also be obtained from the active directory. In step S0801, these pieces of information are acquired first from the directory service. The information representing the network scale serves as a criterion in determining the scale of the network.

In step S0802, the proxy server 300 executes evaluation in accordance with the second criterion. The second criterion is whether a large number of clients connect to (access) a service. If the number "N" of connections from clients is large for a service (service of interest) provided by a device of interest, the proxy server 300 determines that the sharing rate is high. The device of interest (e.g., MFP 200) and client PC 100 have undergone individual identification in steps S0601 to S0606. Service information and scope information are obtained from the metadata 0401 referred to in these processes. The information about the network scale (configuration) is available from the directory server in step S0610. Connection from a device of interest (e.g., MFP 200) to a service of interest is specified on the basis of the address (URI) of the service. Hence, the proxy server 300 can obtain the number "N" of clients (i.e., the number of connections) by counting the number of connection request (e.g., print request) messages designated with the URI of the service of interest while preventing repeated count of identified clients. To prevent repeat counting, it is determined whether the identification information (ID or address) of a transmission source client recorded in each received message has been stored. If no identification information has been stored, the client is newly stored. Simultaneously, the number N of clients is incremented by one. The number N is a value indicating the degree of connection between the service and a number of clients. N of each device is registered in the ranking table as a connection destination count 0912 in FIG. 9A.

A ratio of the number of clients connected to the network may be registered in the ranking table in place of the number of clients itself. More specifically, a ratio is be calculated by placing the number of clients connected to the network in the denominator and the number of clients that have used a specific service provided by a device of interest in the numerator. The sharing rate may be calculated on the basis of the resultant value.

In step S0803, the proxy server 300 executes evaluation in accordance with the third criterion. The third criterion is whether the total utilization of a service is large. A device of interest that is open to the public on the network and used by a number of clients and provides a service for which the total number "n" of accesses from the clients is large is determined as a device with a high sharing rate. The total number of accesses to a service provided by a device of interest is obtained by counting, for each device, the number of messages hooked by the proxy server 300. This corresponds to a value obtained by adding the value counted in step S1705 of FIG. 17 for each device of interest. In step S0803, this value is associated with the device ID and registered in the sharing rate ranking table 0901 as a data amount 0913.

In step S0804, the proxy server 300 executes evaluation in accordance with the fourth criterion. The fourth criterion (S0804) is whether a device designated by a client and the client of the message transmission source exist in the same scope. The proxy server 300 executes count processing for a device with destination designation from a client in the same scope. A device with a high count has a high use frequency of users in the same scope. For example, for a client newly connected in the same scope, a device with a high count may be recommended. The counter value is registered in the device sharing rate ranking table 0901 as a local user count 0914.

In step S0805, the proxy server 300 executes evaluation in accordance with the fifth criterion. The fifth criterion is whether a device has a high capability and a large number of services. Whether a device has advanced performance is determined on the basis of the metadata and, more specifically, device information of the device of interest (e.g., MFP 200). Since the lowest level is cut in advance, the data of device capability level is used for an auxiliary purpose to, for example, determine the final ranking of devices that have the same score for the remaining conditions. The capability value indicates the number of provided services or, if the device of interest is a printer, the number of pages printed per unit time. For example, if the proxy server 300 is set not to count printers of 10 ppm (the number of pages printed per min) or less, the capability value item 0915 is not updated for a printer of 10 ppm or more. For a printer of 10 ppm or more, processing of updating the capability value item 0915 is executed. This value is registered in the sharing rate ranking table 0901 as the capability value 0915.

When the above-described procedure is executed for each device, the device sharing rate ranking table shown in FIGS. 9A and 9B is completed. The proxy server 300 is assigned a scope of which the proxy server 300 has charge. The proxy server 300 executes the above-described procedure in FIG. 8 for each device in the assigned scope. When the proxy server 300 sorts the sharing rate ranking table shown in FIGS. 9A and 9B by giving priority orders for each item, the device IDs are sorted by sharing rate. In this embodiment, priority orders are sorted using items 0912 to 0915 in FIG. 9A as a key. Sorting by priority order indicates the ranking of devices using a key of a low priority order if their ranking cannot be determined using a key with a high priority order. That is, items are sorted using a first key, and then items of the same score are sorted using a second key.

It is also possible to generate the sharing rate ranking using other items; FIG. 9B shows an example. In the example shown in FIG. 9B, the number of connection destinations, the number of searches, the number of information requests (the number of device information request messages), the data amount per month (the number of messages per month), the date and time of first connection, the date and time of latest connection, and the number of services are registered in this order in the sharing rate ranking table 0901. The number of connection destinations equals the number of clients of the connection destinations. When the proxy server 300 sorts the table on the basis of the priority order using the items as a key, the device IDs are sorted by sharing rate. Since the sharing rate ranking is specified on the basis of item information that should have a high priority, as shown in FIG. 8, the client can preferentially install (introduce) a device of greater convenience.

How to determine the range of devices and services in the ranking table as a notification target to the client PC 100 will be described next.

<Listing Order for Client>

Figure 10:
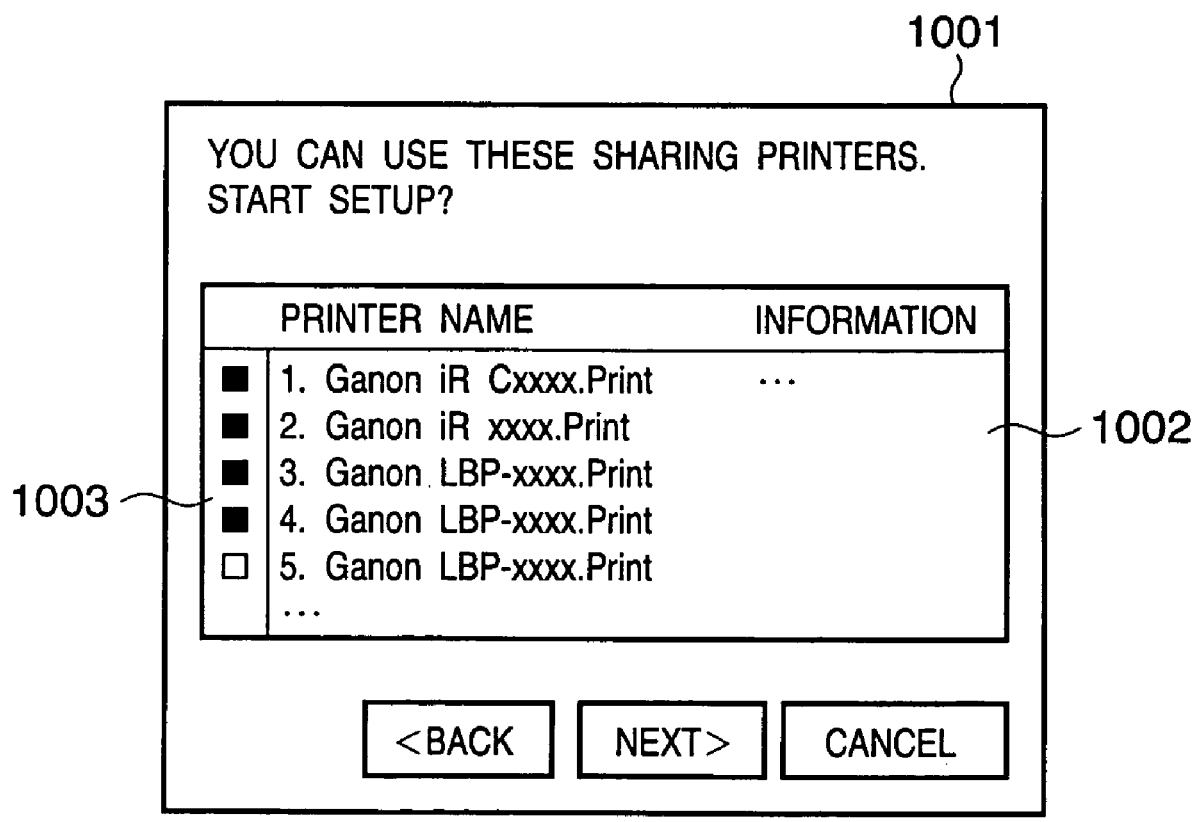
FIG. 10 is a view showing an installation UI displayed on the client in the present invention.

FIG. 10 shows an example of a UI displayed on the client PC 100. Upon receiving a device information request from the client, the proxy server 300 returns, to the client, information representing the fact that a predetermined number of high-ranked devices in the sorted device sharing rate ranking table have a high sharing rate ranking and also returns the device information of those devices. The predetermined number of high-ranked devices is not always fixed. Upon receiving the device information response, the client causes, for example, a driver installer to display the user interface in FIG. 10 in step S0507 of FIG. 5.

In step S0507 of FIG. 5, the driver installer displays a printer setup start dialogue 1001 shown in FIG. 10. A model list 1002 contains devices listed in the following order. The device sharing rate ranking table generated in accordance with the procedure shown in FIG. 8 is sorted by using, as a key, the number of clients, the service utilization amount, the number of local users, and the capability value on the basis of priority order, thereby listing the device IDs. In this way, the devices are listed in descending order of sharing rates. New devices and devices with utilization track records are added to the end of the device list. These devices may also be sorted by sharing rate.

That is, on the basis of the device information request received from the proxy server 300, the client PC 100 displays the device list in accordance with the following order.

(a) Devices in descending order of sharing rates.

(b) New devices and devices with utilization track records. These devices are returned to the client after (a).

(c) Devices whose sharing rates lower than a predetermined rank are not displayed in the list.

The devices whose sharing rates are lower than a predetermined rank are determined by, for example, the proxy server 300. The proxy server 300 determines, on the basis of the device sharing rate ranking table, a predetermined number of low-ranked devices as devices whose sharing rates are lower than a predetermined rank. The proxy server 300 does not return the device information of these devices to the client.

The client PC 100 selects, of the devices listed in the order according to the rules (a) and (b), the predetermined number of high-ranked devices in advance as a driver installation target. More specifically, a selection flag indicating whether to install a driver is provided in, for example, the RAM in correspondence with each device. The flag is set for a target device. On the dialogue 1001 serving as a user interface, a check box 1003 is selected. FIG. 10 shows a state wherein four high-ranked devices are selected as an installation target. When the user clicks the "next" button in the dialogue 1001, the user interface notifies the plug-and-play controller 0111 of the device information of the devices with the selection flag set. Upon receiving the notification, the plug-and-play controller 0111 searches for a driver matching the device attribute information on the storage device via the memory controller and installs the driver.

Figure 11:
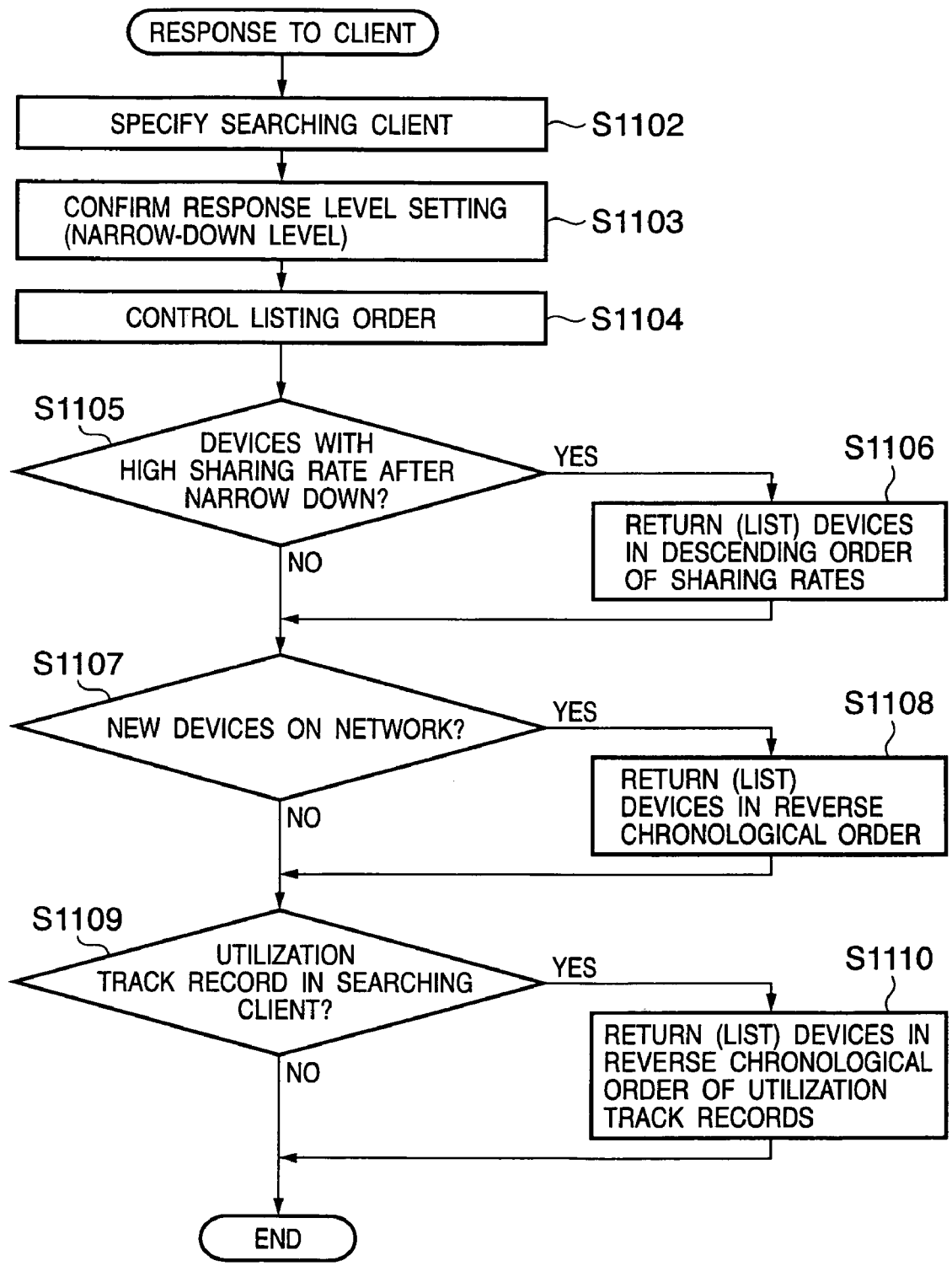
FIG. 11 is a flowchart of device list control by the proxy server 300.

FIG. 11 is a list control flowchart for the proxy server 300. In step S1102, the proxy server 300 specifies the client of the issue source of the device information request message. More specifically, the proxy server 300 reads out the transmission source address or client ID of the device request message. In step S1103, the proxy server 300 reads out a response setting (to be described later). In step S1104, the proxy server 300, for example, sorts the sharing rate ranking table in the above-described manner and determines the device listing order in steps S1105 to S110.

If the proxy server 300 determines that there are devices with high sharing rates ranked on the basis of track record data (i.e., sharing rate ranking table) in accordance with the response setting (YES in step S1105), the proxy server 300 lists the devices in descending order of sharing rates in step S1106. "Listing" indicates transmitting device information to the client in accordance with an ordering (e.g., sharing rate ranking). Whether a sharing rate is high or low is determined in the above-described manner. That is, the proxy server 300 is set in advance to determine, as devices with high sharing rates, a predetermined number of high-ranked devices. Devices with high sharing rates can be specified using the setting information such as communication setting information. The device list contains device information and service information, which are saved in association with each device ID. It is therefore easy to select the device and service information of a device with a high sharing rate from the device list.

If the proxy server 300 finds new devices on the network (YES in step S1107), the proxy server 300 lists the devices in reverse chronological order in step S1108. The proxy server 300 records the reception date and time of the first response to a Hello message or search message and the device ID of the transmission source in association with each other. In the process of step S1107, if the recorded date and time and the current date and time are included within a predetermined period of time, the proxy server 300 determines the associated device as a new device. The device can be determined to be newer if the time lag between the recorded date and time and the current date and time is short. That is, the proxy server 300 associates the dates and times of connection for each peripheral device and uses a ranking sorted by date and time as the sharing rate ranking.

The proxy server 300 determines whether there are devices with utilization track records by the client (step S1109). If the proxy server 300 determines that there are devices with utilization track records, the proxy server 300 lists the devices in reverse chronological order of utilization track record in step S1110. In step S1110, the devices may be listed in descending order of utilization track record. A utilization track record can be obtained by counting the number of messages sent from the client for each device, as described above.

With the above-described procedure, the proxy server 300 can return a device information response message to a device information request message in an order corresponding to the sharing rate ranking of devices. By executing the processing in step S1107, the proxy server 300 can recommend, to the client, even a device that has newly joined the network ad therefore has a small utilization track record value. That is, the proxy server 300 selects recommendable printers on the basis of not only the information of the sharing rate ranking table but also a plurality of viewpoints.

<Settings for Responses to Clients>

In step S1103 of FIG. 11, a response level setting is read out. The proxy server 300 or the setting operation unit 0711 of the management utility 600 that concentrates the management unit 0703 of the proxy server 300 can set the response level to the client. The response level can be set by the following methods. The proxy server 300 may execute one of the methods in a fixed manner. Alternatively, the user may select one of the methods.

(1) Step Expression:

The user sets the response level by using a step expression represented by three steps; in other words, sharing rates 1 through 3. Note that the number of steps may be increased. The setting operation unit 0711 displays a user interface containing a slider that can move through three levels, low, medium, and high. The set response level is saved at a predetermined address in the hard disk or memory. In step S1103 of FIG. 11, the set response level is read out and determined as "low", "medium", or "high".

The proxy server 300 sorts the ranking table from the high-ranked devices on the basis of the number of client connections to each device in the scope in step S1104 of FIG. 11 (as described above). If "high" is designated as the response level, the proxy server 300 finds a portion where the connection count distribution has a gap. More specifically, the proxy server 300 calculates the difference in connection count between adjacent devices in the sorted sharing rate ranking table. A portion where the connection count difference is maximum is defined as the boundary between "medium" and "low". Hence, when "high" is designated as the response level, the proxy server 300 returns the device information of devices on the upper side of the boundary to the client in step S1106.

If "medium" is designated as the response level, devices with a small client connection count are cut. For example, the proxy server 300 does not return device information about devices whose connection count is 0 to 3 in step S1106.

If "low" is designated as the response level, the proxy server 300 returns, to the client, device information about all devices registered in the sharing rate ranking table. In this case, the device information about a new device or a device with a utilization track record is also returned in step S1106. Hence, the sequence from step S1107 can be omitted.

Figure 12:
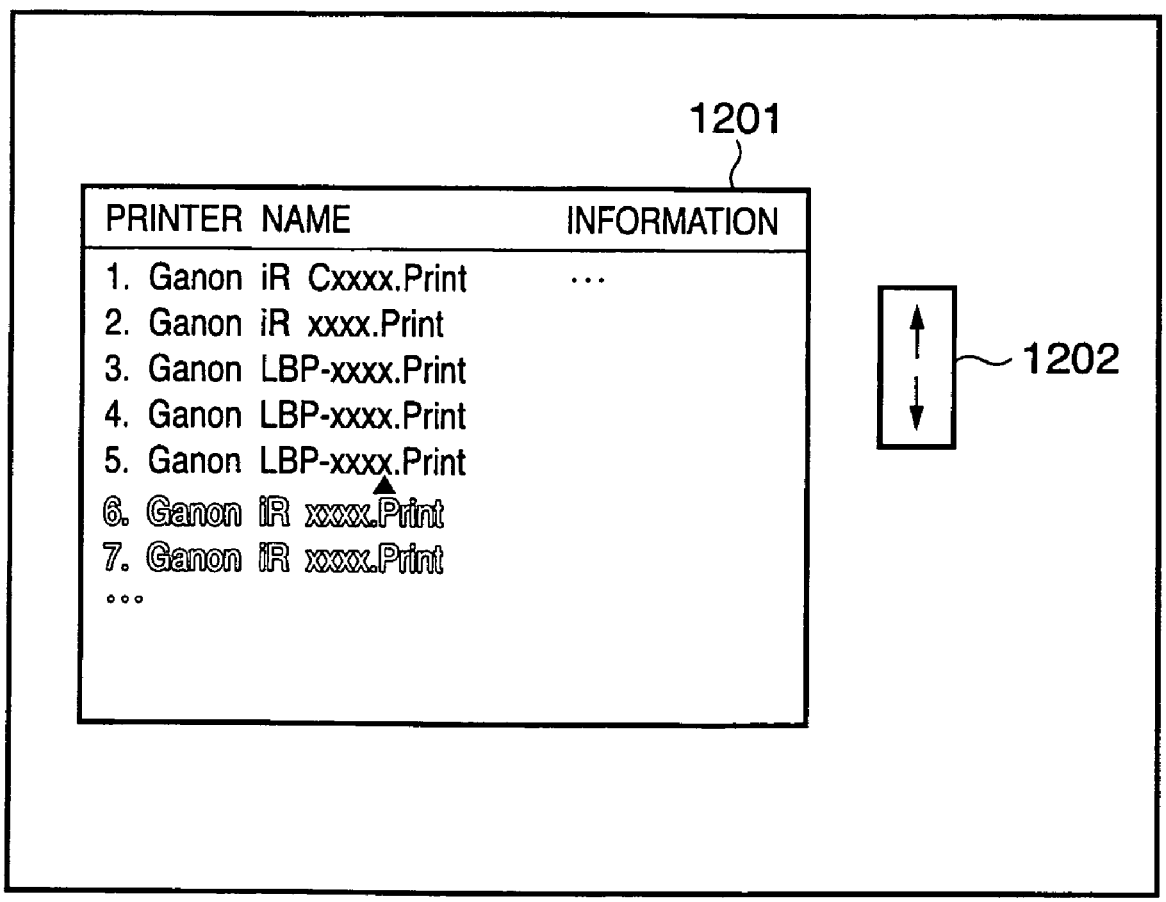
FIG. 12 is a view showing an example of a setting UI using the ranking table of the proxy server 300.

(2) Ranking Table:

The second method uses the ranking table. The setting operation unit 0711 displays the sorted sharing rate ranking table (e.g., device names) and causes the user to designate the boundary line (borderline) for response to the client. FIG. 12 shows an example of a UI using a ranking table displayed by the proxy server 300. The proxy server 300 displays a ranking table 1201. The user moves the boundary line by using a slider 1202. Devices above the boundary line are the target of a device information response to a device information request. In this method, the proxy server 300 stores, as the response level, the device ID of a designated device and returns device information about devices above the response level in response to a device information request. In the example shown in FIG. 12, a device recognized as sharing rate ranking 5 is designated as the boundary. Hence, the client is notified of device information about devices with a sharing rate higher than that device. Alternatively, the number of devices designated as a target is stored as the response level. The stored number of high-ranked devices are selected from the latest sharing rate ranking table as a device information response target. That is, in the example shown in FIG. 12, the client is notified of device information about five high-ranked devices. Alternatively, the device ID of the lowest rank of the selected targets is stored as the response level. Devices are selected from the top to the stored device ID in the latest sharing rate ranking table as a device information response target. The proxy server 300 transmits, to the client, device information selected by one of the above-described methods in step S1106.

(3) Number Expression:

The third method directly designates the number of devices. The setting operation unit 0711 displays a spin box. The user inputs a numerical value from the displayed spin box. The notification is stored in, for example, a memory as the response level. The UI has a spin box in place of the slider 1202 in FIG. 12. The proxy server 300 reads out the stored numerical value in step S1103 of FIG. 11 and returns device information about the designated number of devices from the top of the sharing rate ranking table in step S1106. For example, when 4 is selected as the notification number, the client is notified of device information about four high-ranked devices in the sharing rate ranking.

Figure 18:
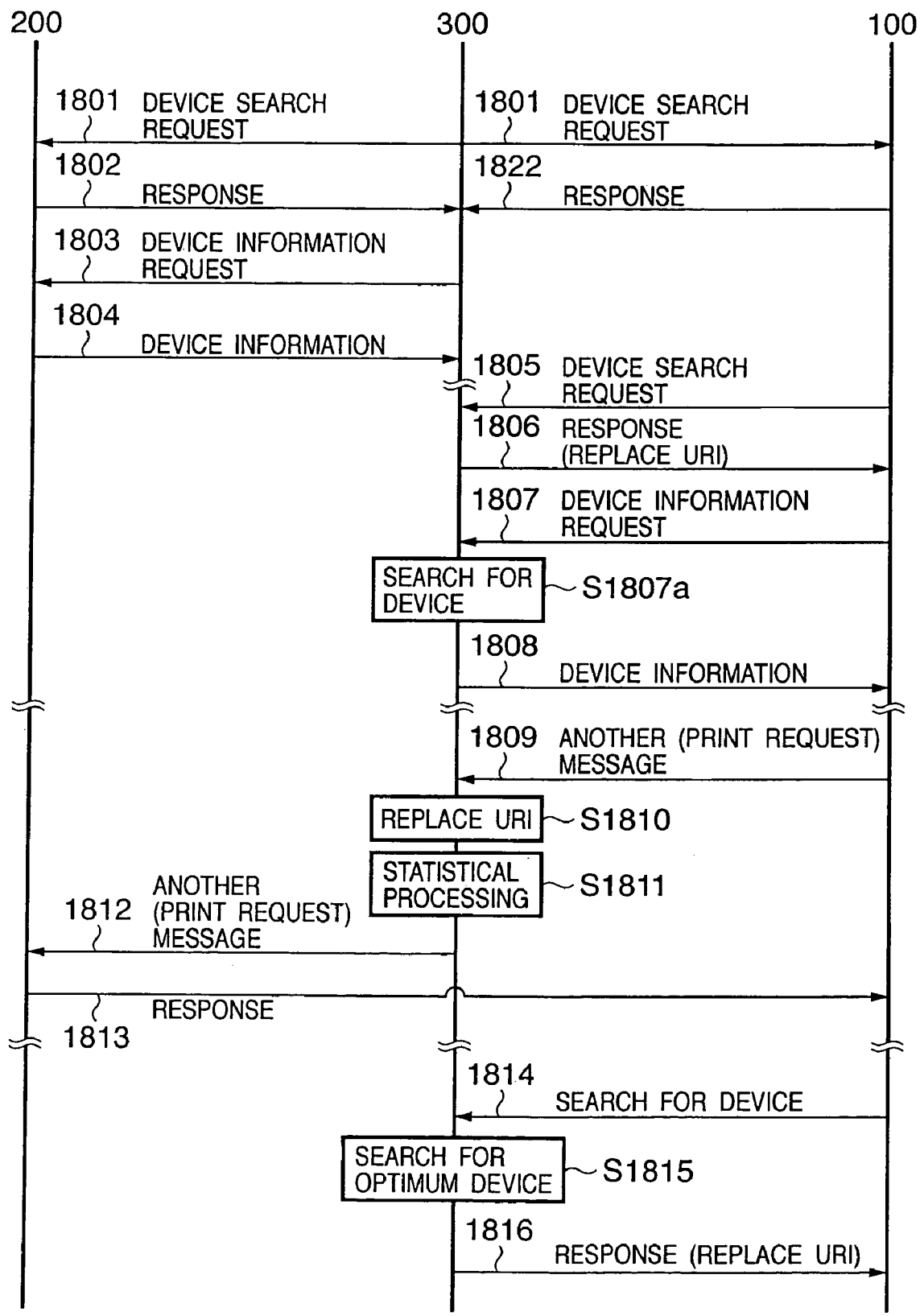
FIG. 18 is a message sequence chart of the network plug-and-play system.

FIG. 18 shows an example of the message exchange procedure between the client, the device, and the proxy server 300. Referring to FIG. 18, the processing of each device is controlled by causing its CPU to execute a program.

Referring to FIG. 18, when the proxy server 300 transmits a device search request 1801, the device 200 returns a response 1802. When the proxy server 300 transmits a device information request 1803, the device 200 returns device information 1804. If the device ID is not fixed, the device 200 determines this before transmission of the device information. The client PC 100 is also designated as the transmission destination of the device search request. The client PC 100 returns a response 1822 to the proxy server 300. The proxy server 300 can request more detailed information of the client. In this example, however, obtaining the existence and address or ID of the client is sufficient so the proxy server 300 does not request any more information. Upon receiving a network join notification (Hello) message from the client or device, the proxy server 300 transmits a device information request to the device.

Upon receiving a device search request 1805 issued by the client, the proxy server 300 replaces the URI of the transmission source with the URI of the proxy server 300 and transmits a response 1806 to the client PC 100. Hence, the client PC 100 transmits a device information request 1807 using the URI of the proxy server 300 described in the response 1806. Upon receiving the device information request 1807, the proxy server 300 specifies recommendable devices by searching for them on the basis of the held sharing rate ranking table (1807a) and returns specified device information 1808 to the client. FIG. 22 shows device information transmitted from the proxy server 300 to the client PC 100. FIG. 20 shows the device list held by the proxy server 300. FIG. 21 shows the result of sorting using sharing rate ranking information. That is, the proxy server 300 holds device information about six devices 200 to 205. When receiving a device information request from the client in this state, the proxy server 300 specifies device information to be transmitted and notifies the client of it. For example, assume that the proxy server 300 is configured to send device information about three high-ranked devices. In this case, the proxy server 300 notifies the client of the device information regarding three high-ranked devices, as shown in FIG. 22. At this time, the address information in the device information contains the address information of the proxy server 300. That is, the proxy server 300 intercepts and receives a message transmitted/received between a terminal and a peripheral device. When information about a peripheral device is transmitted in response to an inquiry message from a terminal, response information containing the destination information of the information processing apparatus is transmitted to the terminal. When the client which has received the device information shown in FIG. 22 executes, for example, print processing, the print data transmission destination information contains the address information of a selected device and the address information of the proxy server 300. For this reason, a message between the client and the device passes through the proxy server 300. The device information is transmitted from the proxy server 300 to the client PC 100 in accordance with the procedure shown in FIG. 11. The proxy server 300 and client PC 100A also exchange a service information request and response, although not illustrated in FIG. 18. The client executes a device driver installer on the basis of the received device information. More specifically, when the client executes installation processing, the user interface shown in FIG. 10 is displayed. The device driver of a device selected by the user is installed to make the device usable.

The client PC 100 acquires the device and service information and transmits a print request (instruction) message 1809 in response to, for example, a print request from an application program. This message is sent to the address described in the response 1806. That is, the message is transmitted to the address of the proxy server 300, which is replaced by the proxy server 300. Upon receiving (hooking) the message, the proxy server 300 rewrites the transmission destination URI to the URI of the device (1810), counts the message in accordance with the procedure shown in FIG. 8, and updates the sharing rate ranking information shown in FIG. 9 (1811). After that, the proxy server 300 transfers the received message to the proper recipient (i.e., the device (1812)). The replaced message transmission destination URI describes the URI of the proxy server 300 and the URI of the device which are delimited by, for example, a semicolon. Hence, the proper transmission destination can be obtained by removing the URI of the proxy server 300 from the transmission destination URI. The device 200 returns a response message 1813 to the received message. In this manner, a message of, for example, print is transmitted from the client to the device.

When the client (this client may be different from the client involved in the above-described procedure) transmits a device search request 1814 to the proxy server 300, the proxy server 300 searches for devices to return in accordance with the procedure shown in FIG. 11 and returns device information 1816 of the found devices to the client. This process is the same as in steps 1807 and 1808.

In the network system of this embodiment, the proxy server 300 manages the device information of each network device by adopting the above-described procedure. The proxy server returns device information of a device with a high sharing rate in response to a device information request from the client. The proxy server also returns device information of a newly connected device even when the sharing rate is low. The proxy server also returns device information of a device with a high utilization track record even when its sharing rate is low. Thus, the client can acquire device information of only devices with a high use probability instead of all of a number of network devices connected to the network. Because the number of device drivers installed in the client decreases, it is possible to save the resources of the client computer. Additionally, the user can easily select devices to use because the candidates are narrowed down in advance.

In the first embodiment, the proxy server 300 generates the sharing rate ranking information shown in FIG. 9 by hooking messages between the client and the device. However, the present invention is not limited to this. For example, if the client recognizes that the proxy server 300 is connecting, it may execute device information request processing (GetMetadata) on the proxy server 300. At this time, the client may designate a specific device and request its device information. The proxy server 300 may generate the sharing rate ranking information shown in FIG. 9 by managing each client that has transmitted a device information request and the device specified by the client. For example, in the case of a client A sending a device information request to the proxy server 300 to acquire information regarding device 200. The proxy server 300 then notifies the client of the information it holds regarding the device 200. Simultaneously, the proxy server 300 counts the acquisition request to acquire information regarding the device 200 sent from the client A. The device sharing rate information shown in FIG. 9 may be generated by accumulating the count information.

According to the first embodiment, the proxy server 300 selects devices with a high use probability from a very large number of devices connected to the network and notifies the client of them. Hence, the client can prevent wasted memory and user operation errors which occur due to installation of a number of device drivers.

According to the first embodiment, even when a computer is connected to a network with a plurality of network devices connected, the number of programs such as device drivers installed on the computer can be constrained. When programs to be installed are selected in accordance with the sharing rates of corresponding devices, only devices with a high use probability are selected so that the user convenience is further improved.

Note that the proxy server 300 may count a device information request message to request function information about a peripheral device and generate a device priority ranking table in accordance with the count.

Second Embodiment

As described in the first embodiment, a proxy server 300 or a setting operation unit 0711 of the management utility 600, which collects the functions of the management unit 0703 of the proxy server 300, can designate which client transmits device information in response to a request and which client does not. It is possible to set the response level using the same UI as the above-described printer setup start dialogue 1001 displayed at the client.

FIG. 13 shows a dialogue 1301 displayed by the setting operation unit 0711 of the proxy server 300. The IT manager (the manager of the proxy server 300) selects (turns on check boxes) devices, from the device name list displayed in the dialogue 1301, whose device information should be returned to the client. Information representing the check contents is stored in the proxy server 300 and transmitted to a client PC 100 together with device information. When the client receives the device information, the device name list is displayed, as shown in FIG. 10, in installing device drivers. In accordance with the information received from the proxy server 300 and representing the selection state, the same devices as those selected in the user interface in FIG. 13 are selected in the displayed user interface shown in FIG. 10.

As a result, the IT manager can explicitly specify the printers with a high sharing rate in the proxy server 300. The user of the client can select device drivers to be installed independent from the settings of the IT manager. For this reason, the sharing rate determination by the IT manager can be omitted using the same arrangement and control as in the first embodiment. To extend the operation and determination of the proxy server 300, the method of the first embodiment is used as an "automatic" mode. The method of the second embodiment is defined as a "manual" mode. The manager of the proxy server 300 selects one of the modes. In this case, the user can select a mode on the proxy server 300. When the manual mode is selected, the proxy server 300 transmits, to the client, information representing devices selected by the IT manager.

Since devices are selected manually, the procedure in FIG. 8 or the procedure in step S1104 of FIG. 11 described in the first embodiment may be omitted. This decreases the load in hook control and sharing rate ranking table generation.

Third Embodiment

In the first embodiment, the proxy server 300 hooks another event (message) in step S0508 of FIG. 5. To hook a message, it is necessary to refer to the message and metadata passing through the route 0607 in FIG. 6. For this purpose, URI replacement is done in process 0604. However, if an external system has the message reference function to generate a sharing rate ranking table, the proxy server 300 need not hook the message so process 0604 can be omitted.

FIG. 14 is a view showing an example when the system has the message reference function. A proxy server 300 (11) sets a necessary event in the system and (12) receives a notification if the event occurs (processes 1407 and 1408). The system is, for example, a client computer 200 or server computer 400. An event is an operation with message transmission, including a print request (print instruction). The proxy server 300 transmits information to specify an event, which is input by the user, to the client or server and registers the information in it. The client or server receives the information to specify an event and, if an event occurs, determines whether the event equals the event registered from the proxy server 300. If it is the registered event, the client or server transmits, to the proxy server 300, a replica of a message to be transmitted in correspondence with the event. For example, assume that the proxy server 300 registers a "print request" in the client and printer as an event. In this case, the client transmits a print request message to the device (printer) and also transmits a replica of the message to the proxy server 300. The proxy server 300 counts the message on the basis of the received message. The received message is discarded.

In this way, the processes 1407 and 1408 serve as hook control executed by the proxy server 300. The remaining arrangement is the same as in the first embodiment so that the same effect as in the first embodiment can be obtained. The same substitution is possible even when the system has a log corresponding to the sharing rate ranking table (also called a track record table) 0901.

Fourth Embodiment

On the basis of the WS-Discovery specifications, a device which wants to disjoin from a network transmits (broadcasts) a Bye message to the network. The Bye message has a meaning opposite to the above-described Hello message. Reception of the Bye message can trigger uninstallation processing as a counterpart to installation of a device driver or application of the first embodiment.

When an MFP 200 with a high sharing rate disjoins from the network, the client uninstalls the device driver of the MFP 200 after a predetermined waiting time. The procedure of this processing will be described. The waiting time is a fixed value. For example, a value input from an operation UI is stored and used. This procedure prevents execution of installation and uninstallation processing if a device disjoins and returns in a short time. In this embodiment, the device unicasts a Bye message to a proxy server 300 instead of broadcasting.

Figure 15A:
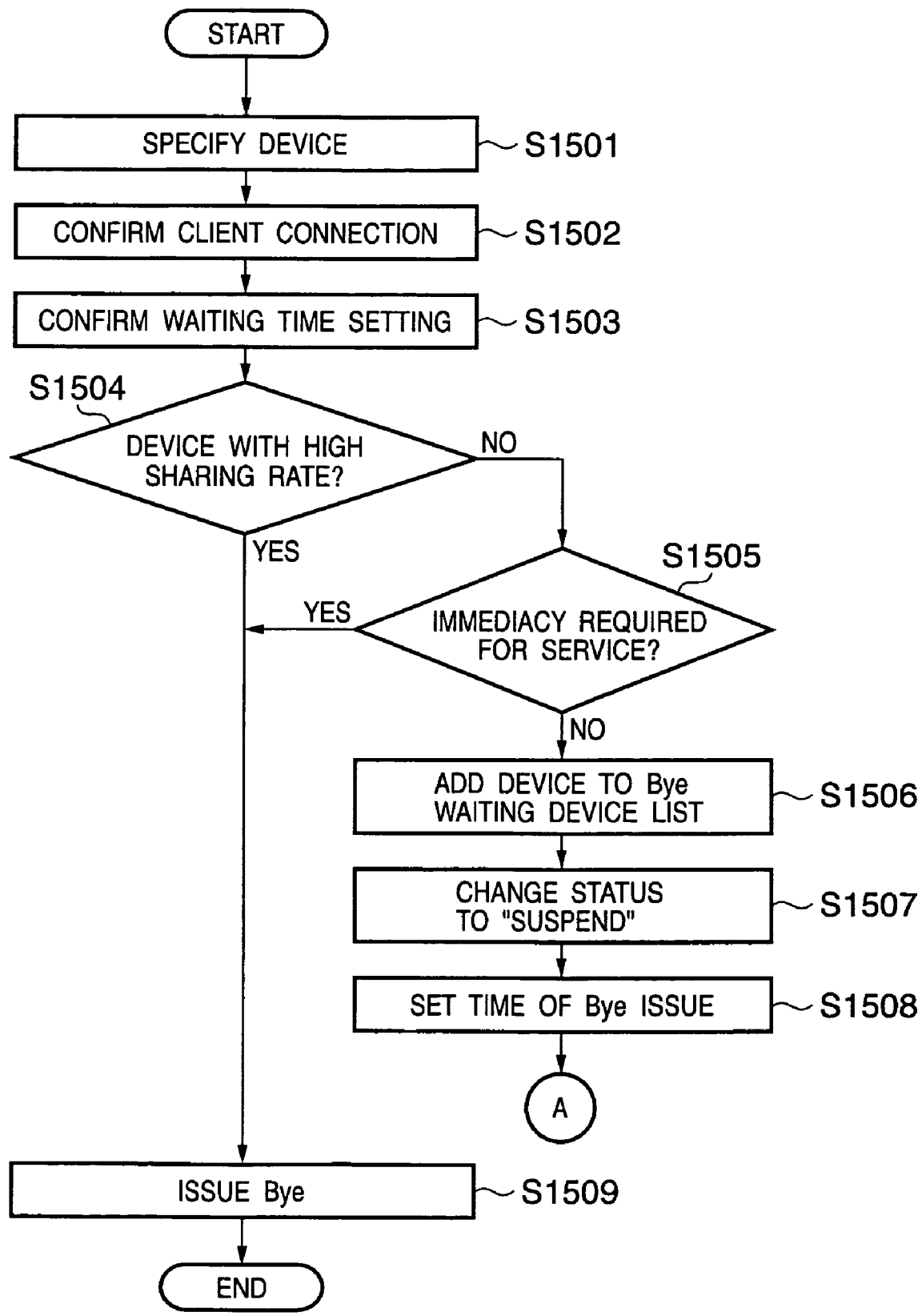
FIGS. 15A and 15B are flowcharts showing control of the proxy server 300 at the time of device disjoin.
Figure 15B:
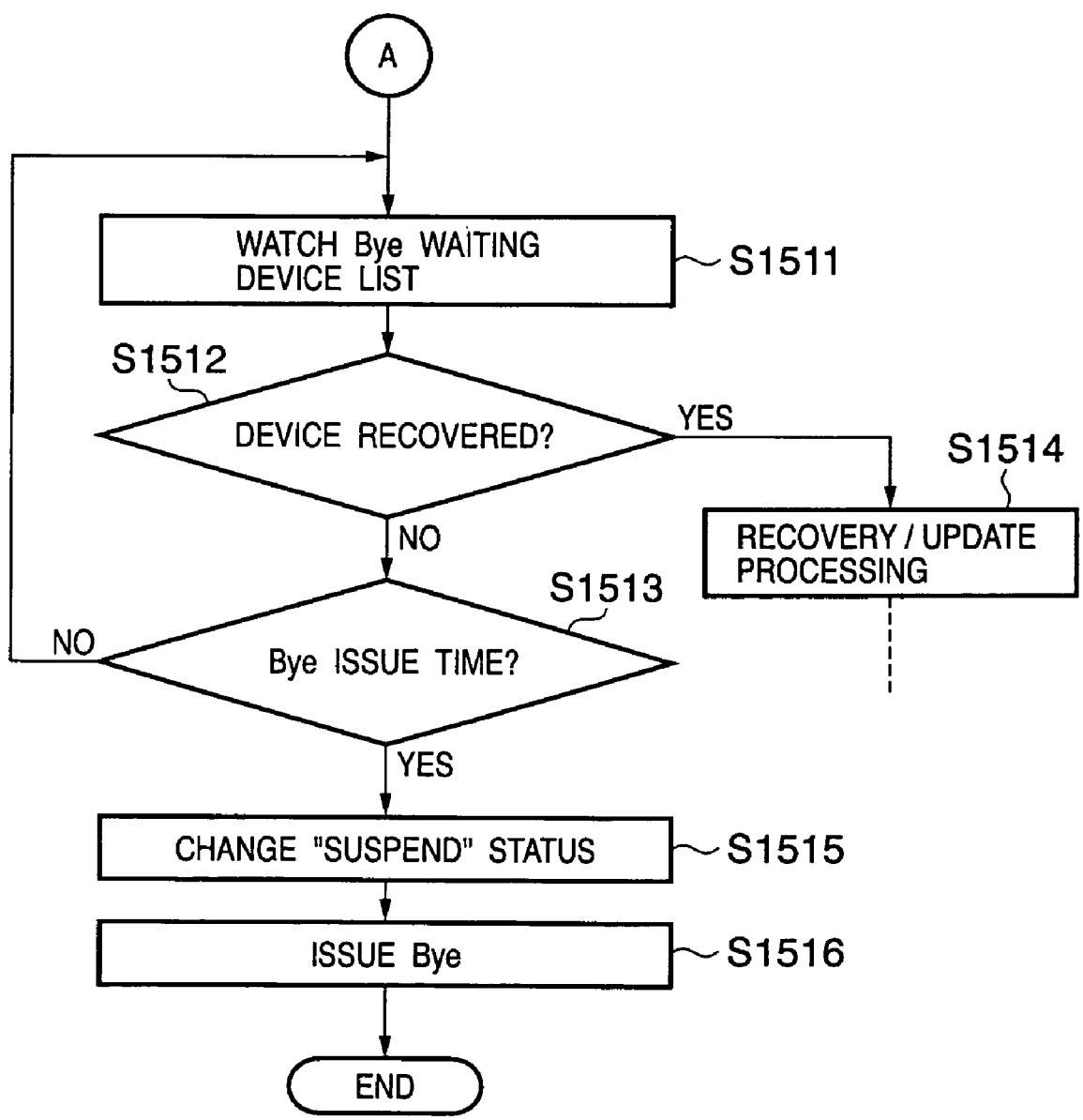

FIGS. 15A and 15B are flowcharts for explaining processing by the proxy server 300 upon receiving a Bye message from a device (i.e., at the time of disjoin). In step S1501, the proxy server 300 specifies the Bye message transmission source device. More specifically, the proxy server 300 reads out the transmission source address contained in the message. In step S1502, the proxy server 300 confirms connection to the client. Connection confirmation is done for example, by transmitting an echo message. In step S1503, the proxy server 300 confirms the waiting time. Confirmation here indicates reading out, for example, a waiting time setting value from a storage area of the proxy server 300.

In step S1504, the proxy server 300 determines whether the Bye message transmission source device has a high sharing rate. To perform this determination, the sharing rate ranking table provided in the proxy server 300 is sorted by the processing method described with reference to FIG. 11. The boundary between "high" and "medium" is determined, as described in "Step Expression of Response Level". If the Bye message transmission source device is included in the range of "high", the device is determined to have a high sharing rate. If the sharing rate is high, a Bye message is broadcast to the network in step S1509. As the transmission source address of the Bye message, the address of the Bye message transmission source device, which serves as a trigger for the processing shown in FIGS. 15A and 15B, is written.

When the sharing rate is determined not to be high, it is determined in step S1505 whether the service requires immediacy. If immediacy is required, a Bye message is transmitted to the network. This determination is made by determining whether the service provided by the Bye message transmission source device includes a service registered in advance with the proxy server 300. A service is represented using an ID or a URI.

If the sharing rate is low, and the service requires no immediacy, standby processing is executed. In this case, the ID of the Bye message transmission source device is additionally registered in the Bye waiting device list (step S1506). In step S1507, the proxy server 300 changes the status of the Bye waiting device to "suspend" for the outside. For example, if a device information request for the device is received, the proxy server 300 returns information indicating that the device is in a suspended state. In step S1508, the proxy server 300 registers, in the Bye waiting device list, a Bye message issue time for the device in association with the device ID. This time can be a predetermined constant. The proxy server 300 loops through steps S1511 to S1513 in the standby state. If the device recovers in step S1512, the process advances to step S1514 to execute recovery or update (determined from metadata) processing. Recovery of the device can be determined, for example, by receiving a Hello message from the device, or by transmitting a Probe message every predetermined time and receiving a response to it. If the Bye issue time comes in step S1513, the proxy server 300 changes the "suspend" status to, for example, "disjoin" in step S1515. In step S1516, a Bye message indicating that the device has disjoined from the network is issued (broadcast). Upon receiving the Bye message, the client uninstalls the device driver of the transmission source device.

With the above-described procedure, the network client need not uninstall the device driver of a device that temporarily disjoins from the network in a short time due, for example, to being powered off. This improves the processing efficiency of the client. For a device with a high sharing rate or a device that provides a service requiring immediacy, the client uninstalls the device driver immediately after a disjoin from the network. This prevents a device with a high sharing rate or a device used for an immediate service from remaining in a pause state due to disjoin and being erroneously selected.

In the above-described embodiments, installation/uninstallation of a driver corresponding to a discovered network device has been described as an example of plug-and-play. The embodiments are also applicable to an arrangement for automatically installing, in the client PC 100, a utility or application necessary for using and controlling a network device.

In the above-described embodiments, a printer is used as a network device. However, the embodiments are applicable to any device usable and controllable through a communications medium, including a scanner and a storage device.

In the above-described embodiments, the client PC 100 holds, on the memory, a driver to control a network device. The embodiments are applicable not only to a device driver but also to an application and to utility software. The software may be held on either a network device or a third server.

In the first embodiment, the sharing rate ranking table is sorted, giving a priority order to each item. Any other method can also be employed; for example, adding weighted values of each item and sorting the table using the values as a key.

The table may be sorted using one of the items of the sharing rate ranking table shown in FIG. 9A or 9B as a key. It is possible to change the priority order of a key. The priority order is changed depending upon which items are of greatest importance.

The table may be sorted by using the date and time of first connection of a device itself as a key. Alternatively, the date and time of latest connection of a device may be registered in the sharing rate ranking table and sorted by the date and time.

Fifth Embodiment

In this embodiment, a technique of updating the recommendation level of a device driver in accordance with message exchange between a client PC 100 and a proxy server 300 will be described. This embodiment includes processing of updating a recommendable device and processing of sending a recommendable device notification in response to a request from the client PC 100.

Figure 28:
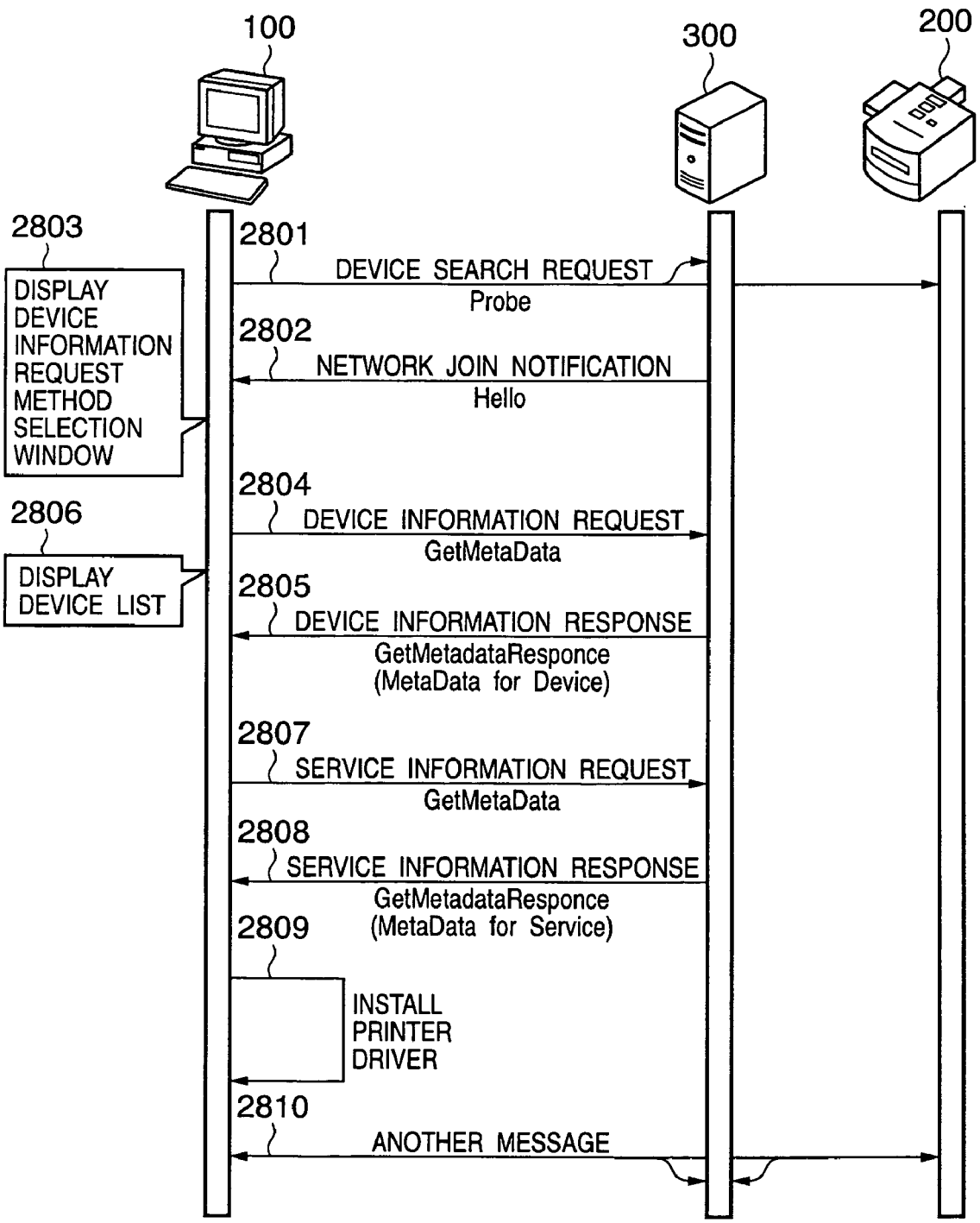
FIG. 28 is a sequence chart showing an example of the sequence of the fifth embodiment.

The sequence of processing of updating a recommendable device in this embodiment will be described first with reference to FIG. 28.

The client PC 100 issues and multicasts a device search request (Probe) (2801). The Probe can contain target device information. For example, to confirm the existence of a printer, a Probe containing information to specify a printer is issued. The Probe can also designate, for example, a color printer.

Upon receiving the Probe, the device 200 determines whether it matches the device information contained in the Probe. For example, if the Probe contains information to specify a printer, the printer returns a network join notification (Hello) signal as a response to the Probe (2802). The Hello signal contains the address information of the device that has issued the Hello signal. The proxy server 300 also determines, in accordance with reception of the Probe to confirm, for example, the existence of a printer, whether the proxy server 300 holds information about the printer. If the proxy server 300 holds the information, it issues a Hello signal as a response to the Probe. The Hello signal issued by the proxy server 300 as a response to the Probe contains identification information indicating that the response was returned from the proxy server 300. Upon receiving the Hello signal containing the identification information indicating that the proxy server 300 has issued the signal, the client PC 100 executes message exchange processing with the proxy server 300 after step S2802. In FIG. 28, a description will be made assuming that the client PC 100 receives a Hello signal with identification information indicating that the proxy server 300 has issued the signal.

Figure 24:
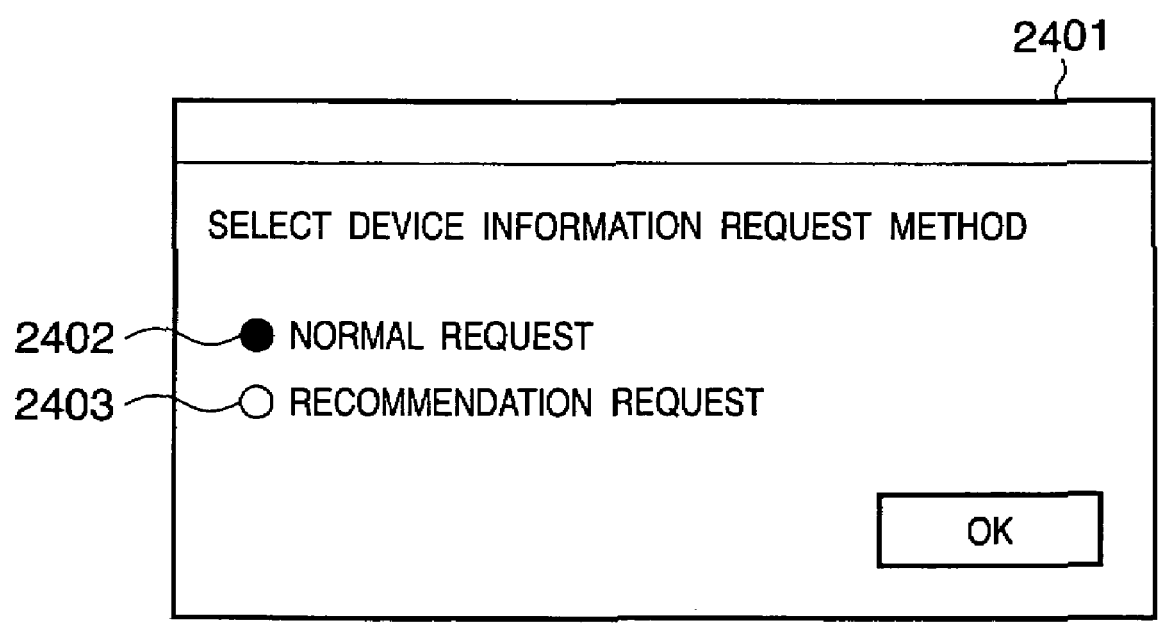
FIG. 24 is a view showing an example of a dialogue to select a device information request method.

Upon receiving the Hello signal with identification information indicating that the proxy server 300 issued the signal in step 2802, the client PC 100 displays the selection window 2401 in FIG. 24 to select a device information request method (step 2803). The device information request method selection window 2401 will be described. On the selection window 2401, a normal request 2402 or recommendation request 2403 based on a recommendation level can be selected. At this point, processing will progress assuming that the normal request 2402 is selected. Processing executed when the recommendation request 2403, which is based on a recommendation level, is selected will be described later.

The client PC 100 issues a device information request signal containing the device information request method selected on the selection window 2401 (step 2804). More specifically, the device information request issued in step 2804 is a signal to request a device list to be described later with reference to FIGS. 25 and 27. In this embodiment, the device information request will also be referred to as a second message.

The proxy server 300 analyzes the device information request method in accordance with the reception of the device information request signal (device list acquisition request). Since the normal request has been selected, the proxy server 300 creates a device list (e.g., FIG. 25) based on a predetermined rule (e.g., ascending order of device names) without using management information in FIG. 26 (to be described later) and issues the device list to the client PC 100 (step 2805). The proxy server 300 needs only to issue a list about the device designated by the Probe in step 2801. For example, assume that the proxy server 300 holds information about two devices, a printer and a facsimile apparatus, and receives a search request for the printer from the client PC 100. In this case, only the printer information is described in the list issued in step 2805. The information about the facsimile apparatus is excluded. FIG. 25 shows a device list 2501 displayed at the client PC 100 in response to the device information response. The client PC 100 advances to processing of requesting the service information of a device selected by the user through the device list 2501.

The client PC 100 displays the device list in accordance with the device information response in step 2805 (step 2806). As described above, since the normal request 2402 has been selected, the client PC displays the device list in FIG. 25 based on the ascending order of device names as an example of the predetermined rule. The user selects a desired device via the device list. FIG. 25 shows a state wherein printers 1 and 2 are selected.

The client PC 100 issues a device information request signal to acquire the service information of the devices selected via the device list (step 2807). More specifically, service information refers to the function information of a device. Function information represents the functions executable by a device: for example, whether color printing is possible or whether staple processing is possible. In this embodiment, the service information request will also be referred to as a first message.

The proxy server 300 specifies the device as the service information request target upon receiving the service information request, updates the priority based on the number of messages for the device, and returns the requested service information of the device to the client PC 100 (step 2808).

Message count management information to update the priority of each device managed by the proxy server 300 will now be described. In FIG. 26, the number of requests for service information is maintained for each printer. For example, in FIG. 25, since printers 1 and 2 are selected, and a service information request is issued, the proxy server 300 increments the number of messages for printers 1 and 2 in accordance with the service information request. As a result, the proxy server 300 can maintain, on the basis of the number of messages, how many service information requests have been issued for which device (which device is selected via the device list). The proxy server 300 recognizes a device with a large number of messages as a device shared by many users and assigns a high priority to it.

The client PC 100 installs a printer driver in accordance with a service information response (step 2809).

Processing of displaying a recommended device list in response to a request from the client PC 100 in this embodiment will be described next with reference to FIG. 28. Steps 2801 and 2802 are the same as those of the above-described processing, and a detailed description will be omitted.

Upon receiving a Hello with distinguishing information indicating that the proxy server 300 has issued the signal in step 2802, the client PC 100 displays the selection window 2401 in FIG. 24 to select a device information request method (step 2803). Processing executed when the recommendation request 2403 based on a recommendation level will be described here.

The client PC 100 issues a device information request based on the recommendation request 2403 selected via the window in FIG. 24 displayed at the time of the device information request (step 2804).

Upon receiving the device information request with the selection of the recommendation request 2403, the proxy server 300 generates a device list sorted by priorities in accordance with the information managed in FIG. 26 and returns the device list to the client PC 100 (step 2805).

The client PC 100 displays the device list based on the priority in accordance with the response in step 2805 (step 2806). A device list 2701 based on the priority will be described with reference to FIG. 27. Assume that the proxy server 300 manages the information shown in FIG. 26. The proxy server 300 determines priorities on the basis of the number of messages of each device and generates a device list sorted by the priorities. As a result, the device list 2701, shown in FIG. 27 sorted by priority, is returned to the client PC 100.

The client PC 100 displays, for example, the device list 2701 shown in FIG. 27. Thus, the user can easily specify a printer driver with a high priority (i.e., installed by many users). For example, a user who has newly joined the network can install a printer driver shared by many users.

Figure 29:
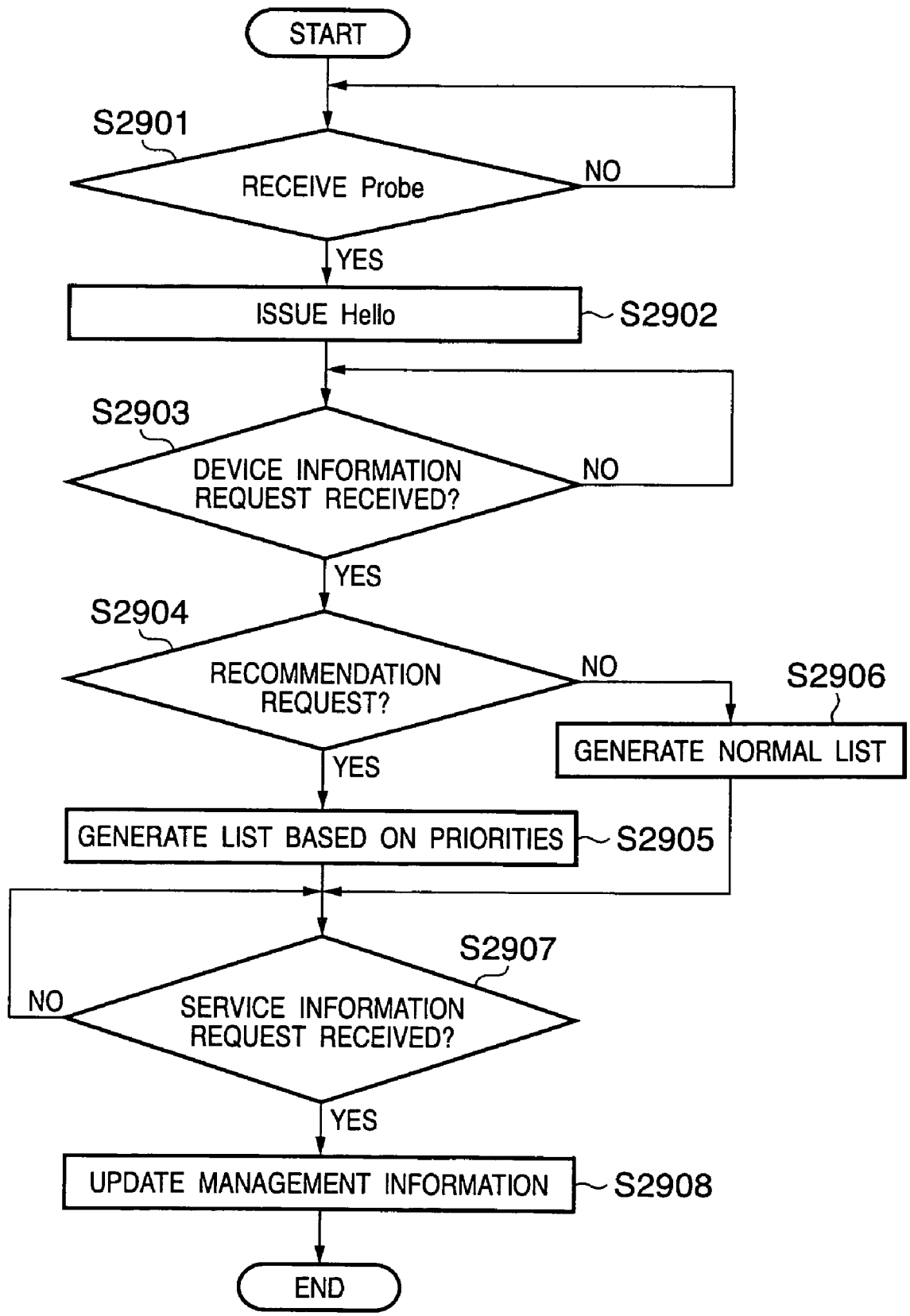
FIG. 29 is a flowchart showing processing executed by a proxy server 300 according to the fifth embodiment.

Processing of the proxy server 300 according to this embodiment will be described next with reference to FIG. 29.

The proxy server 300 determines whether a device search request (Probe) has been received (S2901).

Upon determining in step S2901 that a device search request has been received, the proxy server 300 issues a Hello signal to the client PC 100 as the Probe signal transmission source (S2902). The Hello signal contains identification information indicating that the proxy server 300 has issued the signal. The received Probe signal contains the address information of the client PC 100 of the issue source. The proxy server 300 issues a Hello signal to the address.

The proxy server 300 determines whether a device information request has been received from the client PC 100 (S2903).

Upon determining in step S2903 that a device information request has been received, the proxy server 300 determines whether the request is a recommendation request to request a list based on priority (S2904).

Upon determining in step S2904 that the request is not a recommendation request (NO in step S2904), the proxy server 300 generates a device list in ascending order of, for example, printer names (S2906).

Upon determining in step S2904 that the request is a recommendation request (YES in step S2904), the proxy server 300 generates a list based on priority. More specifically, the proxy server 300 counts, for each device, service information requests issued from the client PC 100 and maintains, for each device, the number of messages received from the client PC 100. The pieces of maintained information are shown in FIG. 26 described above. That is, each time a service information request is received, the proxy server 300 analyzes the device whose service information is requested and increments a message counter representing the number of messages with the device as the request target. The count value serves as a priority. The proxy server 300 generates a device list based on the priority (based on the number of messages) and sends it in step S2905.

The proxy server 300 determines whether a service information request has been received (S2907). If a service information request has been received, the proxy server 300 analyzes the device whose service information has been requested and updates a message counter (i.e., maintained information corresponding to the device as the request target (S2908)).

As described above, according to the present invention, at the time of device information request (device list request), the user can select a normal request or a recommendation request to request a list that allows specification of a recommended device installed by many users. When the user selects the recommendation request, the proxy server 300 generates a recommended device list sorted by devices installed by many users and sends it. This allows the user who wishes to install a printer driver, and even a user who has newly joined the network, to easily install a device driver with a high sharing rate (i.e., a device driver installed by many users).

Devices with high priorities can be determined on the basis of the use log of each device. A problem of this method will be described. For example, assume an environment wherein a monochrome printer is normally used to execute monochrome printing while a color printer is used to execute color printing for a meeting once in several months. In this case, the color printer that is rarely used may be excluded from the recommended device list. If a user newly joins the network and wishes to execute color printing, he/she may not quickly do so because the printer driver of the color printer is not installed.

However, the present invention is able to avoid this problem because devices installed by many users are recommended. It is possible to install minimum device drivers required on the network.

<Summary of the Invention>

The arrangements and operations of the proxy server described in the embodiments according to the present invention will be listed below.

(1) The proxy server determines the sharing rate ranking of network devices (e.g., digital multifunctional peripherals) from information processing apparatuses.

(2) The proxy server selects information (device information) about multifunctional peripherals in the order of sharing rate and returns the selected device information to an information processing apparatus.

(3) The proxy server causes a client to install software such as the device driver of a selected device.

(4) The proxy server has a function of executing individual identification of a client (information processing apparatus) and device and a function of converting and recording address information (URI) to refer to a message between the information processing apparatus and the device.

(5) The proxy server generates a utilization track record table (sharing rate ranking table). The sharing rate is determined on the basis of the following conditions.

The number of connections from a device (multifunctional peripheral) to a client (information processing apparatus).
 The utilization amount (message amount) from a client to a device.
 Comparison of network scope between a client and a device.
 Functions provided by a device.

(6) The proxy server makes a list of devices with a high sharing rate, newly added devices, and devices with a utilization track record in the past and transmits their device information to a client.

(7) The proxy server controls the range of the list based on its configuration.

(8) The proxy server controls initial selection based on its configuration.

(9) The proxy server can set contents to select and return device information to a client.

(10) The proxy server displays an operation UI that sets one of step expression, ranking table, and number.

(11) The proxy server prompts a user to install software such as the device drivers of initially selected devices and devices added or deselected later by the user.

(12) The proxy server displays an operation UI that causes the user to individually select devices (second embodiment).

(13) If a client or device has an event notification function, the proxy server uses the event notification function in place of the unit which converts and records address information (URI) to refer to a message between an information processing apparatus and a multifunctional peripheral.

(14) If a client or device has an event log function, the proxy server makes a replica of the contents of a utilization track record table (sharing rate ranking table) from the system event log. This function is not described in the embodiments. Some clients have the same log function as that of the proxy server to, for example, hook a message and count it for each device or service. The proxy server can request a log of each client and generate a sharing rate ranking table. This operation is done periodically or upon receiving a device information request.

(15) When a device disjoins from the network, the proxy server changes the status of the device held in a client to "suspend". The proxy server also sets a waiting time. If the waiting time elapses without recovery of the device, the proxy server notifies the client of the device disjoin and causes the client to delete the driver. If the device recovers, the proxy server notifies the client of it.

(16) The proxy server incorporates a hierarchical structure of a connection unit, flow control unit, and management unit.

(17) The proxy server can separate management function units for recording, determination, and setting.

(18) The proxy server can collect the separate management function units to a server.

(19) The proxy server can joint the separate management function units into a management utility.

Each processing function of the client. PC 100 and network-compatible device 200 in the above-described embodiments is implemented by reading out a program to implement the processing function from the memory and causing the CPU (Central Processing Unit) to execute the program. However, the present invention is not limited to this. All or some of the processing functions may be implemented by dedicated hardware. The above-described memory may include a non-volatile memory such as a magneto-optical disk device or flash memory. A read-only recording medium such as a CD-ROM, a volatile memory except a RAM, or a computer-readable/writable recording medium that combines them may be used.

A program to implement each function of the client PC 100 or network-compatible device 200 is recorded on a computer-readable recording medium. Each processing function may be executed by causing a computer system to load the program recorded on the recording medium and execute it. The "computer system" includes OS and hardware such as a peripheral device. More specifically, the program read out from the storage medium is written in the memory of a function expansion board inserted into the computer or a function expansion unit connected to the computer. Then, the CPU of the function expansion board or function expansion unit wholly or partially executes actual processing on the basis of the program to implement the functions of the above-described embodiments.

The "computer-readable recording medium" includes a portable medium such as a flexible disk, magneto-optical disk, ROM, and CD-ROM and a storage device such as a hard disk incorporated in the computer system. The "computer-readable recording medium" also includes a memory to hold a program for a predetermined amount of time; for example, a volatile memory (RAM) to store a program is transmitted via a communication line in a computer system serving as a server or client.

The program may be transmitted from the computer system that stores it in, for example, a storage device to another computer system via a transmission medium or a transmission wave in a transmission medium. The "transmission medium" to transmit the program indicates a medium having a function of transmitting information, including a network (communication network) such as the Internet and a communication line such as a telephone line.

The program may implement some of the above-described functions. The program may be a so-called differential file (differential program) capable of implementing the above-described functions when combined with a program already recorded in a computer system.

Association of Invention in Embodiments

The present invention according to the embodiments can also be described in the following way. The present invention relates to an information processing apparatus (proxy server 300) communicable with a peripheral device (device 200) and a terminal (client PC 100). This apparatus has a saving unit, count unit, reception unit, and response unit. The saving unit corresponds to the device list 11*a* saved in the HDD 11. The saving unit receives, from a peripheral device (200), information (device information 1804) about the peripheral device and saves it.

The count unit is equivalent to generating the sharing rate ranking table 0901 by causing the CPU 1 of the proxy server 300 to execute steps S1701 to S1709. The count unit counts the sharing rate of each peripheral device by counting, for each peripheral device, message information (1809) transmitted/received between the terminal (100) and the peripheral device (200).

The reception unit is equivalent to causing the CPU 1 of the proxy server 300 to receive the device information request 1807. The reception unit receives, from the terminal (100), a request message (device information request 1807) to request information about a peripheral device, which is held by the saving unit (device list 11*a*).

The response unit is equivalent to causing the CPU 1 of the proxy server 300 to execute device search processing (1807*a*). When the reception unit receives the request message (device information request 1807), the response unit transmits, to the terminal, information about a peripheral device selected in accordance with its sharing rate obtained by the count unit.

The count unit also receives a message from the terminal to a peripheral device and counts the sharing rate by counting, for each peripheral device, the number of terminals as the transmission source on the basis of the destination and transmission source information of the received message.

This apparatus also has a generation unit which generates sharing rate ranking information representing a sharing rate ranking sorted by using the number of terminals as a key on the basis of the sharing rate of each peripheral device obtained by the count unit. The generation unit is equivalent to causing the CPU 1 to generate the sharing rate ranking table 0901 by executing steps S0801 to S0806.

The response unit selects information about a peripheral device as a transmission target by using the sharing rate ranking information generated by the generation unit.

The present invention according to the fifth embodiment can also be described in the following way. The present invention relates to an information processing apparatus (proxy server 300) communicable with a peripheral device (device 200) and a terminal (client PC 100). This apparatus has a saving unit, first response unit, update unit, reception unit, and second response unit. In this apparatus, the saving unit corresponds to the HDD 11 and device list 11*a*. The saving unit receives, from a peripheral device (200), function information (1804) about the peripheral device and saves it.

The first response unit is equivalent to causing the CPU 1 to transmit the service information response 2808. The first response unit transmits function information (11a) saved by the saving unit (HDD 11) to the terminal (100) upon receiving, from the terminal (100), the first message (service information request 2807) to request function information about a peripheral device (200).

The update unit is equivalent to causing the CPU 1 to update the message counter by executing step S2908. The update unit updates the priority of a recommendable device on the basis of the number of first messages (service information requests 2807) received from the terminal (100) to request function information (11a) about the peripheral device (200).

The reception unit is equivalent to causing the CPU 1 to receive the device information request 2804. The reception unit receives, from the terminal (100), the second message (device information request 2804) to request a list (list 2501) of recommendable peripheral devices.

The second response unit is equivalent to causing the CPU 1 to execute step S2905. The second response unit transmits, to the terminal, a list of peripheral devices determined on the basis of the priorities updated by the update unit when the reception unit receives the second message (2804).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-013088, filed Jan. 20, 2006, 2006-332612, filed Dec. 8, 2006, which are hereby incorporated by reference herein in their entirety.

What is claimed is:

1. An information processing apparatus communicable with a plurality of peripheral devices and a terminal, comprising:
    a saving unit which receives information about each peripheral device of the plurality of peripheral devices from each peripheral device of the plurality of peripheral devices and saves the information;
    a deciding unit which decides a sharing rate indicating use frequency of each of the plurality of peripheral devices based on at least one of (1) a number of terminals which have accessed the peripheral device, (2) a number of messages that each of the plurality of peripheral devices has received and (3) an amount of data that each of the plurality of peripheral devices has received;
    a reception unit which receives, from the terminal, a request message to request the information about the peripheral device, which is held by said saving unit; and
    a response unit which transmits, to the terminal, information about the peripheral device selected in accordance with the sharing rate of each of the plurality of peripheral devices decided by said deciding unit when said reception unit receives the request message, wherein the selected peripheral device is displayed in order in accordance with the sharing rate in the terminal.

2. The apparatus according to claim 1, further comprising:
    an adding unit which adds address information of the information apparatus to address information of the peripheral device to intercept the message from the terminal to the peripheral device in accordance with the request message transmitted from the terminal, wherein said response unit transmits the information about the peripheral device to which the address information of the information is added; and
    an intercept unit which intercepts the message from the terminal to the peripheral device transmitted based on the address information of the peripheral device and the information apparatus.

3. The apparatus according to claim 1, further comprising a user interface unit which receives selection of a peripheral device by using the sharing rate ranking information, wherein said response unit transmits information about the peripheral device selected by said user interface unit to the terminal together with information representing that the peripheral device is selected.

4. The apparatus according to claim 1, further comprising a user interface unit which accepts selection of a peripheral device by using the sharing rate ranking information, wherein said response unit transmits information about the peripheral device selected by said user interface unit to the terminal.

5. A control method of an information processing apparatus communicable with a plurality of peripheral devices and a terminal, comprising the steps of:
    receiving information about each peripheral device of the plurality of peripheral devices from each peripheral device of the plurality of peripheral devices and saving the information;
    deciding a sharing rate indicating use frequency of each of the plurality of peripheral devices based on at least one of (1) a number of terminals which have accessed the peripheral device, a number of messages that each of the plurality of peripheral devices has received and (3) an amount of data that each of the plurality of peripheral devices has received;
    receiving, from the terminal, a request message to request the information about the peripheral device, which is held in the saving step; and
    transmitting, to the terminal, information about the peripheral device selected in accordance with the sharing rate of each of the plurality of peripheral devices decided in the deciding step when the request message is received in the message receiving step, wherein the selected peripheral device is displayed in order in accordance with the sharing rate in the terminal.

6. The method according to claim 5, further comprising the steps of:
    adding address information of the information apparatus to address information of the peripheral device to intercept the message from the terminal to the peripheral device when the response unit transmits the information about the peripheral device in accordance with the request message transmitted from the terminal, wherein said response unit transmits the information about the peripheral device to which the address information of the information apparatus is added; and
    intercepting the message from the terminal to the peripheral device transmitted based on the address information of the peripheral device and the information apparatus.

7. The method according to claim 5, further comprising receiving selection of a peripheral device by using the sharing rate ranking information, wherein in the transmitting step, information about the peripheral device selected in the user interface step is transmitted to the terminal together with information representing that the peripheral device is selected.

8. The method according to claim 5, further comprising receiving selection of a peripheral device using the sharing rate ranking information, wherein in the transmitting step, information about the peripheral device selected by the user interface unit is transmitted to the terminal.

9. A computer-readable recording medium on which is recorded a control program executable by an information processing apparatus communicable with a plurality of peripheral devices and a terminal, the control program causing a computer to execute an information processing method comprising the steps of:

receiving information about each peripheral device of the plurality of peripheral devices from each peripheral device of the plurality of peripheral devices and saving the information;

deciding a sharing rate indicating use frequency of each of the plurality of peripheral devices based on at least one of (1) a number of terminals which have accessed the peripheral device, (2) a number of messages that each of the plurality of peripheral devices has received and (3) an amount of data that each of the plurality of peripheral devices has received;

receiving, from the terminal, a request message to request the information about the peripheral device, which is held in the saving step; and transmitting, to the terminal, information about the peripheral device selected in accordance with the sharing rate of each of the plurality of peripheral devices decided in the counting step when the request message is received in the message receiving step, wherein the selected peripheral device is displayed in order in accordance with the sharing rate in the terminal.

* * * * *